(12) United States Patent
Takami et al.

(10) Patent No.: US 10,308,234 B2
(45) Date of Patent: Jun. 4, 2019

(54) CONTROL DEVICE

(71) Applicant: AISIN AW CO., LTD., Anjo-shi, Aichi-ken (JP)

(72) Inventors: Shigeki Takami, Anjo (JP); Toru Souda, Okazaki (JP); Tatsuya Hasegawa, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 64 days.

(21) Appl. No.: 15/544,438

(22) PCT Filed: Mar. 3, 2016

(86) PCT No.: PCT/JP2016/056633
§ 371 (c)(1),
(2) Date: Jul. 18, 2017

(87) PCT Pub. No.: WO2016/152445
PCT Pub. Date: Sep. 29, 2016

(65) Prior Publication Data
US 2017/0349159 A1      Dec. 7, 2017

(30) Foreign Application Priority Data

Mar. 23, 2015   (JP) .................................. 2015-059598

(51) Int. Cl.
*B60W 20/10*        (2016.01)
*B60K 6/387*        (2007.10)
(Continued)

(52) U.S. Cl.
CPC ............. *B60W 20/10* (2013.01); *B60K 6/365* (2013.01); *B60K 6/387* (2013.01); *B60K 6/40* (2013.01);
(Continued)

(58) Field of Classification Search
None
See application file for complete search history.

(56) References Cited

U.S. PATENT DOCUMENTS

| 8,229,633 B2* | 7/2012 | Heap ..................... B60W 20/15 |
| | | 701/55 |
| 9,297,447 B2* | 3/2016 | Kim ...................... F16H 37/046 |

(Continued)

FOREIGN PATENT DOCUMENTS

| JP | 2003-104072 A | 4/2003 |
| JP | 2005-192284 A | 7/2005 |

(Continued)

OTHER PUBLICATIONS

May 24, 2016 Search Report issued in International Patent Application No. PCT/JP2016/056633.

*Primary Examiner* — Dirk Wright
(74) *Attorney, Agent, or Firm* — Oliff PLC

(57) ABSTRACT

A control device that switchably has a first drive mode which is attained with the fixing mechanism being in the non-fixing state and in which a rotational speed of the input is steplessly shifted and transmitted to the output and torque of the second rotating electrical machine is transmitted to the output, and a second drive mode which is attained with the fixing mechanism being in the fixing state and the decoupling mechanism being in the non-transmitting state and in which, with the second rotating electrical machine being decoupled from the output, the rotational speed of the input is shifted according to a gear ratio of the differential gear unit and transmitted to the output.

19 Claims, 12 Drawing Sheets

(51) Int. Cl.
  *B60K 6/445* (2007.10)
  *B60W 10/02* (2006.01)
  *B60W 10/08* (2006.01)
  *B60K 6/365* (2007.10)
  *B60W 10/06* (2006.01)
  *B60W 10/115* (2012.01)
  *B60K 6/40* (2007.10)
  *B60W 20/20* (2016.01)
  *F16H 3/72* (2006.01)
  *B60L 50/16* (2019.01)
  *B60W 30/184* (2012.01)

(52) U.S. Cl.
  CPC .............. *B60K 6/445* (2013.01); *B60L 50/16* (2019.02); *B60W 10/02* (2013.01); *B60W 10/06* (2013.01); *B60W 10/08* (2013.01); *B60W 10/115* (2013.01); *B60W 20/20* (2013.01); *F16H 3/728* (2013.01); *B60W 30/184* (2013.01); *B60W 2520/10* (2013.01); *B60W 2710/083* (2013.01); *B60W 2710/1005* (2013.01); *B60W 2710/1011* (2013.01); *B60W 2710/1038* (2013.01); *B60Y 2200/92* (2013.01); *Y02T 10/6239* (2013.01); *Y02T 10/6286* (2013.01); *Y02T 10/7258* (2013.01); *Y10S 903/911* (2013.01); *Y10S 903/914* (2013.01); *Y10S 903/93* (2013.01); *Y10S 903/946* (2013.01)

(56) References Cited

U.S. PATENT DOCUMENTS

| 9,440,526 | B2* | 9/2016 | Okuwaki | B60K 6/387 |
| 9,677,655 | B2* | 6/2017 | Matsubara | B60K 6/387 |
| 2003/0064854 | A1 | 4/2003 | Kotani | |
| 2009/0098969 | A1* | 4/2009 | Tabata | B60K 6/365 |
| | | | | 475/5 |

FOREIGN PATENT DOCUMENTS

| JP | 2006-306343 A | 11/2006 |
| JP | 2008-114848 A | 5/2008 |
| JP | 2010-36680 A | 2/2010 |
| JP | 2010-036880 A | 2/2010 |
| JP | 2013-03673 A | 1/2013 |
| JP | 2013-103673 A | 5/2013 |

* cited by examiner

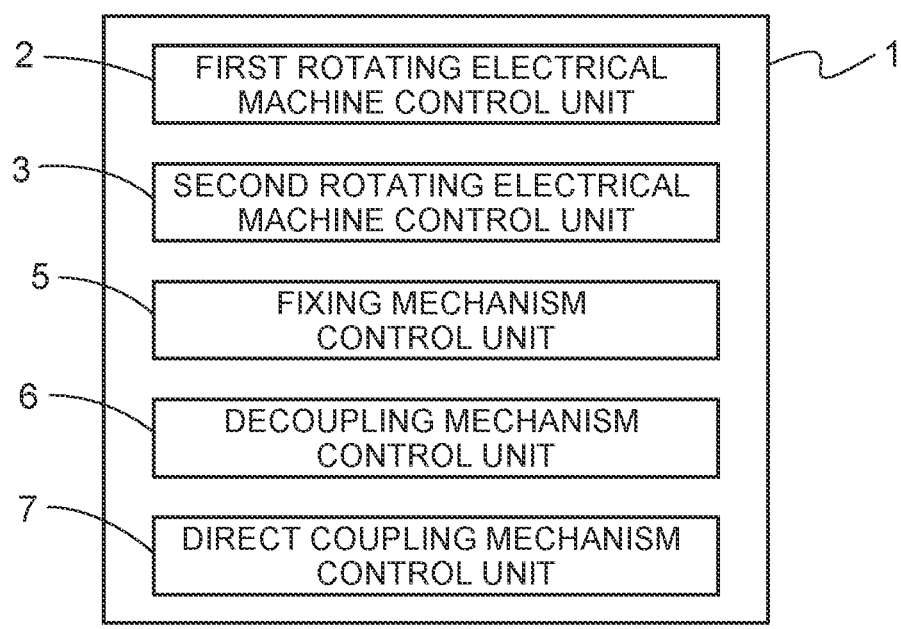

FIG. 15

|       | 50 | 60 |
|-------|----|----|
| Mode1 |    |    |
| Mode3 |    | ○  |
| Mode4 | ○  |    |
| Mode2 | ○  | ○  |

FIG. 16

|       | 50 | 60 | 70 |
|-------|----|----|----|
| Mode1 |    |    |    |
| Mode3 |    | ○  |    |
| Mode2 | ○  | ○  |    |
| Mode5 |    |    | ○  |
| Mode6 |    | ○  | ○  |

FIG. 17

|       | 50 | 60 | 70 |
|-------|----|----|----|
| Mode1 |    |    |    |
| Mode4 | ○  |    |    |
| Mode2 | ○  | ○  |    |
| Mode5 |    |    | ○  |
| Mode6 |    | ○  | ○  |

FIG. 18

|       | 50 | 60 | 70 |
|-------|----|----|----|
| Mode1 |    |    |    |
| Mode2 | ○  | ○  |    |
| Mode5 |    |    | ○  |
| Mode6 |    | ○  | ○  |

FIG. 19

|       | 50 | 60 |
|-------|----|----|
| Mode1 |    |    |
| Mode2 | ○  | ○  |

CONTROL DEVICE

BACKGROUND

The present disclosure relates to control devices that control a vehicle drive device.

Hybrid vehicles using both an internal combustion engine and a rotating electrical machine as driving force sources for wheels have been put to practical use. A device disclosed in Japanese Patent Application Publication No. 2008-114848 is known as an example of vehicle drive devices that are used for such hybrid vehicles. The vehicle drive device of Japanese Patent Application Publication No. 2008-114848 includes an input member that is drivingly coupled to an internal combustion engine, an output member that is drivingly coupled to wheels, and a differential gear unit having three rotary elements, namely a sun gear, a carrier, and a ring gear. A first rotating electrical machine is drivingly coupled to the sun gear of the differential gear unit, the input member is drivingly coupled to the carrier, and the output member and a second rotating electrical machine are drivingly coupled to the ring gear.

The control device of the vehicle drive device of Japanese Patent Application Publication No. 2008-114848 has a plurality of drive modes including a parallel drive mode (including two shift speeds) and a split mode, which can be switched by switching the axial position of a sleeve member of a dog clutch mechanism. For example, fuel consumption at high vehicle speeds is improved by attaining the drive mode in which the first rotating electrical machine is held stationary and the rotational speed of the input member is increased and transmitted to the output member (the higher speed of the parallel drive mode).

In the vehicle drive device of Japanese Patent Application Publication No. 2008-114848, however, the ring gear and the second rotating electrical machine are always coupled so as to rotate together. Accordingly, the maximum vehicle speed of the vehicle equipped with the vehicle drive device is determined by the maximum rotational speed that can be output from the second rotating electrical machine. In order to allow the vehicle to travel at higher vehicle speeds, it is necessary to further increase the maximum rotational speed of the second rotating electrical machine. However, increasing the rotational speed of the second rotating electrical machine brings new problems such as degradation in torque characteristics, an increase in loss, and the need to increase the withstand voltage of an inverter. It is possible to set the gear ratio to a relatively high fixed value so that the rotational speed of the second rotating electrical machine does not become higher than the maximum rotational speed that can be output from the second rotating electrical machine even at the maximum vehicle speed of the vehicle. However, this reduces torque that is transmitted from the second rotating electrical machine to the output member when the vehicle travels at low vehicle speeds, and a sufficient driving force may not be able to be ensured when the vehicle travels at low vehicle speeds.

SUMMARY

An exemplary aspect of the present disclosure ensures a driving force when a vehicle travels at low vehicle speeds and improves fuel consumption when the vehicle travels at high vehicle speeds.

A control device according to the present disclosure controls a vehicle drive device, the vehicle drive device including an input that is drivingly coupled to an internal combustion engine, an output that is drivingly coupled to wheels, a first rotating electrical machine, a second rotating electrical machine that is drivingly coupled to the output, a differential gear unit having three rotary elements, which are a first rotary element that is drivingly coupled to the first rotating electrical machine, a second rotary element that is drivingly coupled to the input, and a third rotary element that is drivingly coupled to the output, a fixing mechanism that is configured to switch between a fixing state where the first rotary element is held stationary with respect to a non-rotary member and a non-fixing state where the first rotary element is allowed to rotate, and a decoupling mechanism that is configured to switch between a transmitting state where power is transmitted between the second rotating electrical machine and the output and a non-transmitting state where power is not transmitted between the second rotating electrical machine and the output, wherein the control device switchably has a first drive mode which is attained with the fixing mechanism being in the non-fixing state and in which a rotational speed of the input is steplessly shifted and transmitted to the output and torque of the second rotating electrical machine is transmitted to the output, and a second drive mode which is attained with the fixing mechanism being in the fixing state and the decoupling mechanism being in the non-transmitting state and in which, with the second rotating electrical machine being decoupled from the output, the rotational speed of the input is shifted according to a gear ratio of the differential gear unit and transmitted to the output.

In this configuration, the vehicle drive device including the differential gear unit having the three rotary elements to which the first rotating electrical machine, the input, and the output are drivingly coupled additionally includes the fixing mechanism and the decoupling mechanism. The drive mode can be switched between the first drive mode and the second drive mode by switching the state of the fixing mechanism and the decoupling mechanism (the fixing state/non-fixing state of the fixing mechanism, the transmitting state/non-transmitting state of the decoupling mechanism). A vehicle can thus travel with the drive mode being switched between the first drive mode and the second drive mode according to the traveling state of the vehicle. In this case, the second drive mode can be attained by using the fixing mechanism having a simpler structure than the decoupling mechanism.

Since the vehicle drive device includes the decoupling mechanism that decouples the second rotating electrical machine from the output when in the non-transmitting state, the speed reduction ratio from the second rotating electrical machine to the output or the wheels can be set appropriately or a low-speed, high-torque second rotating electrical machine can be used. Accordingly, in the first drive mode, a sufficient driving force can be ensured even when the vehicle travels at low vehicle speeds.

For example, by decoupling the second rotating electrical machine while the vehicle is traveling at relatively high speeds, the vehicle can at higher vehicle speeds regardless of a restriction by a maximum rotational speed that can be output from the second rotating electrical machine. Moreover, by attaining the second drive mode when the vehicle travels at relatively high speeds at which the first drive mode is not efficient, the fixing mechanism is switched to the fixing state, and torque of the internal combustion engine transmitted to the input member can he transmitted directly to the output without passing through the first rotating electrical machine. The vehicle can thus travel efficiently.

This configuration can thus ensure the driving farce when the vehicle travels at low vehicle speeds and improve fuel consumption when the vehicle travels at high vehicle speeds.

Further features and advantages of the technique according to the present disclosure will become apparent from the following description of illustrative, non-restrictive embodiments with reference to the accompanying drawings.

BRIEF DESCRIPTION OF THE DRAWINGS

FIG. 2 is a block diagram of a control device.

FIG. 3 is an operation table of a decoupling mechanism, a fixing mechanism, and a direct coupling mechanism.

FIG. 15 is an operation table in a vehicle drive device according to yet another embodiment.

FIG. 16 is an operation table in a vehicle drive device according to a further embodiment.

FIG. 17 is an operation table in a vehicle drive device according to a still further embodiment.

FIG. 18 is an operation table in a vehicle drive device according to a yet further embodiment.

FIG. 19 is an operation table in a vehicle drive device according to a yet further embodiment.

DETAILED DESCRIPTION OF EMBODIMENTS

Embodiments of a control device will be described. A control device 1 is a control device for a vehicle drive device 100 and controls the vehicle drive device 100. The vehicle drive device 100 is a drive device (hybrid vehicle drive device) that drives a vehicle (hybrid vehicle) including both an internal combustion engine EG and rotating electrical machines (a first rotating electrical machine 20 and a second rotating electrical machine 30) as driving force sources for wheels W.

In the following description, the expression "drivingly coupled" means the state where two rotary elements are coupled so that they can transmit a driving force (synonymous with torque) therebetween. This concept includes the state where the two rotary elements are coupled so as to rotate together and the state where the two rotary elements are coupled so that they can transmit a driving force therebetween via one or more transmission members. Such transmission members include various members that transmit rotation at the same speed or a shifted speed (a shaft, a gear mechanism, a belt, etc.). Such transmission members may include an engagement device that selectively transmits rotation and a driving force (a friction engagement device, a meshing engagement device, etc.).

As used herein, the term "rotating electrical machine" is used as a concept including all of a motor (electric motor), a generator (electric generator), and a motor-generator that functions as both a motor and a generator as necessary.

Figure 1:
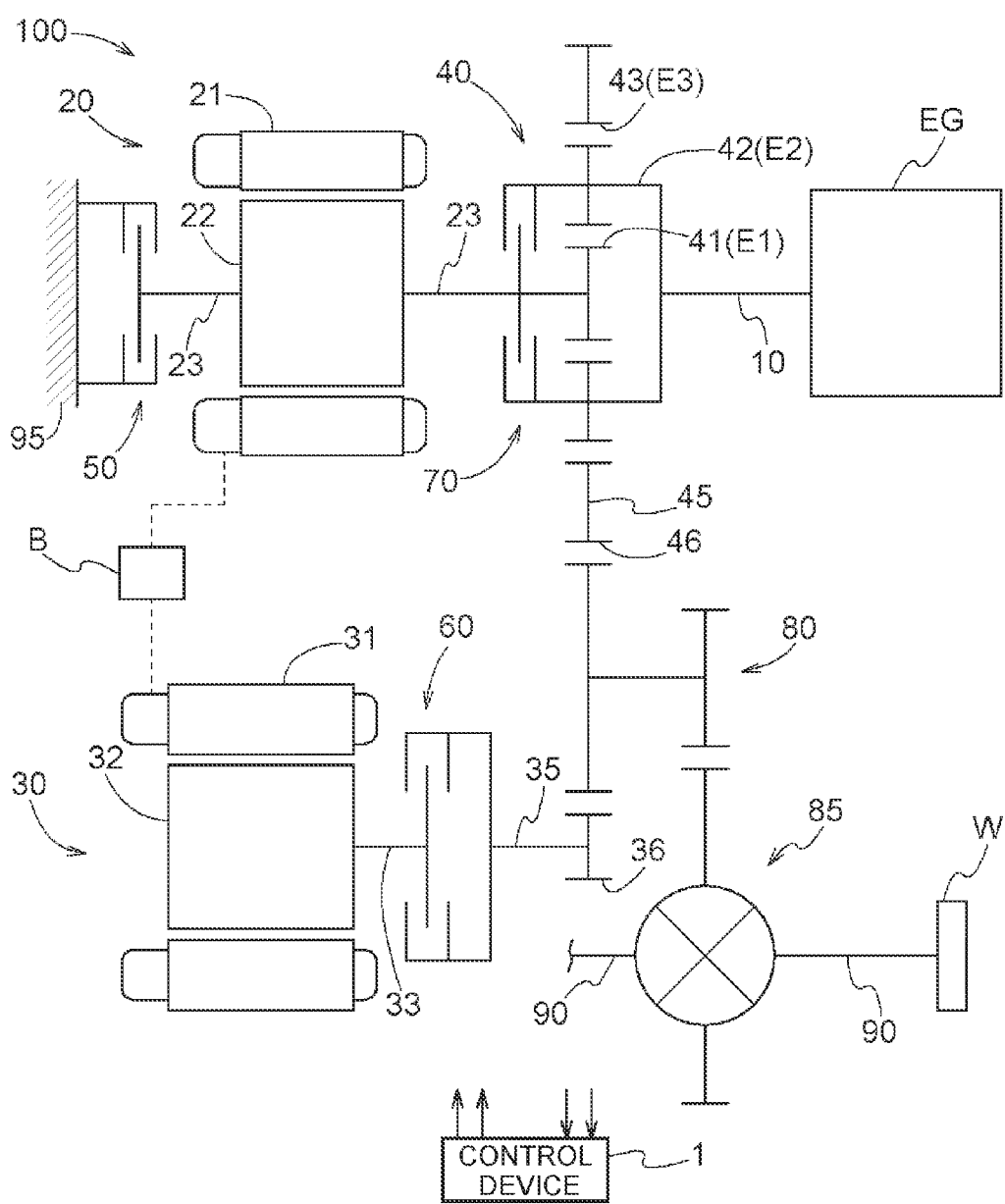
FIG. 1 is a skeleton diagram of a vehicle drive device according to an embodiment.

As shown in FIG. 1, the vehicle drive device 100 that is controlled by the control device 1 includes, as its basic configuration, an input member 10 (i.e., input), a first rotating electrical machine 20, a second rotating electrical machine 30, a differential gear unit 40, and an output member 46 (i.e., output). In addition to this basic configuration, the vehicle drive device 100 further includes a fixing mechanism 50 and a decoupling mechanism 60. In the present embodiment, the vehicle drive device 100 further includes a direct coupling mechanism 70, a counter gear mechanism 80, and an output device (output differential gear unit) 85. These components are accommodated in a case (drive device case) 5. In the present embodiment, the case 95 corresponds to the "non-rotary member." The input member 10, the differential gear unit 40, the direct coupling mechanism 70, the first rotating electrical machine 20, and the fixing mechanism 50 are arranged coaxially.

The input member 10 is drivingly coupled to an internal combustion engine EG. The internal combustion engine EG is a motor that is driven by fuel combustion in the engine to output power (a gasoline engine, a diesel engine, etc.). For example, the input member 10 may be a shaft member. The input member 10 is drivingly coupled to an internal combustion engine output shaft (a crankshaft etc.), namely an output shaft of the internal combustion engine EG. The input member 10 may be coupled to the internal combustion engine output shaft either directly or via other member such as a damper. The input member 10 is coupled to a carrier 42 that is a second rotary element E2 of the differential gear unit 40.

The first rotating electrical machine 20 includes a first stator 21 fixed to the case 95 and a first rotor 22 rotatably supported radially inside the first stator 21. The first rotor 22 is drivingly coupled to the differential gear unit 40 via a first rotor shaft 23. The first rotor 22 is coupled to a sun gear 41 that is a first rotary element E1 of the differential gear unit 40. The first rotor 22 can be selectively held stationary with respect to the case 95 by the fixing mechanism 50. The first rotor 22 can be selectively coupled to the carrier 42, which is the second rotary element E2 of the differential gear unit 40, by the direct coupling mechanism 70.

The second rotating electrical machine 30 includes a second stator 31 fixed to the case 95 and a second rotor 32 rotatably supported radially inside the second stator 31. The second rotor 32 is coupled to a second rotor shaft 33. In the present embodiment, a second output shaft 35 is disposed coaxially with the second rotor shaft 33. The second output shaft 35 is disposed on the opposite side (the internal combustion engine EG side) of the second rotor shaft 33 from the second rotating electrical machine 30 in the axial direction. The second output shaft 35 is coupled to a second output gear 36. The second rotor 32 can be selectively decoupled from the second output gear 36 by the decoupling mechanism 60. The second rotor 32 is drivingly coupled to the output member 46 via the decoupling mechanism 60, the second output gear 36 and the counter gear mechanism 80. The second rotor 32 is also drivingly coupled to the wheels W via the decoupling mechanism 60, the second output gear 36, the counter gear mechanism 80, the output device 85, and a pair of right and left axles 90.

In the present embodiment, the second rotating electrical machine 30 is a low-speed, high-torque rotating electrical machine. That is, the maximum rotational speed that can be output from the second rotating electrical machine 30 is set to a relatively low value and the maximum torque that can be output from the second rotating electrical machine 30 is set to a relatively large value. In particular, regarding the maximum rotational speed, the maximum rotational speed that can be output from the second rotating electrical machine 30 is set to a value lower than the rotational speed corresponding to the maximum vehicle speed at which the vehicle can travel. For example, when the maximum rotational speed that can be output from the second rotating electrical machine 30 is converted to the rotational speed at the position of the output member 46 in a power transmission path, the maximum converted rotational speed, which is determined in proportion to the maximum rotational speed that can be output from the second rotating electrical machine 30, is set to a value lower than the actual maximum rotational speed of the output member 46. The actual maximum rotational speed of the output member 46 is the rotational speed of the output member 46 which is determined in proportion to the rotating speed of the wheels W at the time the vehicle travels at the maximum vehicle speed.

Each of the first rotating electrical machine 20 and the second rotating electrical machine 30 is connected to an electricity storage device B via a corresponding one of inverter devices (not shown). The electricity storage device B supplies electric power to at least one of the first rotating electrical machine 20 and the second rotating electrical machine 30 according to the traveling state of the vehicle to cause the rotating electrical machine to perform power running. The electricity storage device B also receives electric power generated by at least one of the first rotating electrical machine 20 and the second rotating electrical machine 30 according to the traveling state of the vehicle to store the received electric power therein. It is preferable that the electricity storage device B be formed by, e.g., a lithium ion secondary battery, a capacitor, etc. For example, the electricity storage device B may be able to be charged from a household power source. That is, the vehicle drive device 100 of the present embodiment may be a drive device that is used for plug-in hybrid vehicles (plug-in hybrid vehicle drive device).

The differential gear unit 40 has three rotary elements, namely the first rotary element E1, the second rotary element E2, and a third rotary element E3. The differential gear unit 40 has the sun gear 41, the carrier 42, and a ring gear 43 as the three rotary elements. The differential gear unit 40 has the carrier 42 that supports a plurality of pinions, and the sun gear 41 and the ring gear 43 which mesh with the pinions. In the present embodiment, the sun gear 41 corresponds to the "first rotary element E1," the carrier 42 corresponds to the "second rotary element E2," and the ring gear 43 corresponds to the "third rotary element E3." In the present embodiment, the differential gear unit 40 is formed by a single-pinion type planetary gear mechanism. The three rotary elements of the differential gear unit 40 are the sun gear 41 serving as the first rotary element E1, the carrier 42 serving as the second rotary element E2, and the ring gear 43 serving as the third rotary element E3, in order of rotational speed.

The "order of rotational speed" means the order of the rotational speeds of the rotary elements in a rotating state. Although the rotational speed of each rotary element varies depending on the rotational state of the differential gear unit 40, the order of the rotational speeds of the rotary elements is always the same as it is determined by the structure of the differential gear unit 40. The "order of the rotational speeds of the rotary elements" is the same as the order in which the rotary elements are arranged in a speed diagram (also called nomogram).

The sun gear 41 serving as the first rotary element E1 is drivingly coupled to the first rotating electrical machine 20. The first rotary element E1 is coupled to the first rotor 22 via the first rotor shaft 23 so as to rotate with the first rotor 22. The first rotary element E1 can be selectively held stationary with respect to the case 95 by the fixing mechanism 50. The first rotary element E1 can be selectively directly coupled to the carrier 42 serving as the second rotary element E2 by the direct coupling mechanism 70.

The carrier 42 serving as the second rotary element E2 is drivingly coupled to the input member 10. The second rotary element E2 functions as an "input rotation element (rotary element to which input rotation to the differential gear unit 40 is transmitted)" of the differential gear unit 40. The second rotary element E2 can be selectively coupled to the sun gear 41 serving as the first rotary element E1 by the direct coupling mechanism 70.

The ring gear 43 serving as the third rotary element E3 is drivingly coupled to the output member 46. The third rotary element E3 functions as an "output rotation element (rotary element to which output rotation from the differential gear unit 40 is transmitted)" of the differential gear unit 40. The ring gear 43 is formed as an internal gear in the inner peripheral surface of a cylindrical ring gear formation member 45. In the present embodiment, the output member 46 is configured as an external output gear formed in the outer peripheral surface of the ring gear formation member 45. The output member 46 is drivingly coupled to the wheels W via the counter gear mechanism 80, the output device 85, and the pair of right and left axles 90.

The fixing mechanism 50 switches the state of rotation of the first rotary element E1 with respect to the case 95 according to the state of the fixing mechanism 50. The fixing mechanism 50 switches between the fixing state where the first rotary element E1 is held stationary with respect to the case 95 and the non-fixing state where the first rotary element E1 is allowed to rotate. For example, the fixing mechanism 50 can be formed by a normally open friction engagement device, a normally closed friction engagement device, a meshing engagement device, etc. For example, in the case where the fixing mechanism 50 is formed by a normally open friction engagement device, the fixing mechanism 50 switches to the non-fixing state when a servo mechanism, such as a hydraulic cylinder, is not driven, and switches to the fixing state when the servo mechanism is driven.

When the fixing mechanism 50 is in the non-fixing state, the first rotary element E1 and the first rotating electrical machine 20 that rotates with the first rotary element E1 can rotate at a desired rotational speed according also to the traveling state of the vehicle etc. When the fixing mechanism 50 is in the fixing state, the first rotary element E1 and the first rotating electrical machine 20 are held stationary with respect to the case 95 and the rotational speeds of the first rotary element E1 and the first rotating electrical machine 20 are zero. In the following description, the state where the fixing mechanism 50 functions to "hold the first rotary element E1 stationary with respect to the case 95" is sometimes referred to as the "operating state" of the fixing mechanism 50.

The decoupling mechanism 60 switches the state of power transmission between the second rotating electrical machine 30 and the output member 46 according to the state of the decoupling mechanism 60. The decoupling mechanism 60 switches between the transmitting state where power is transmitted between the second rotating electrical machine 30 and the output member 46 and the non-transmitting state where power is not transmitted between the second rotating electrical machine 30 and the output member 46. The second rotating electrical machine 30 is drivingly coupled in common to both the output member 46 and the wheels W via the counter gear mechanism 80. In the present embodiment, the decoupling mechanism 60 is disposed between the second rotor shaft 33 and the second output shaft 35, namely in a part of the power transmission path connecting the second rotating electrical machine 30 and the counter gear mechanism 80. Accordingly, by switching between the transmitting state and the non-transmitting state, the decoupling mechanism 60 can switch between the state where power is transmitted between the second rotating electrical machine 30 and the Wheels W and the state where power is not transmitted between the second rotating electrical machine 30 and the wheels W. The decoupling mechanism 60 can also be formed by a normally open friction engagement device, a normally closed friction engagement device, a meshing engagement device, etc. For example, in the case where the decoupling mechanism 60 is formed by a normally closed friction engagement device, the decoupling mechanism 60 switches to the transmitting state when a servo mechanism, such as a hydraulic cylinder, is not driven, and switches to the non-transmitting state when the servo mechanism is driven.

When the decoupling mechanism 60 is in the transmitting state, power is transmitted between the second rotating electrical machine 30 and the output member 46 via the second output gear 36 and the counter gear mechanism 80. In the transmitting state, power is also transmitted between the second rotating electrical machine 30 and the wheels W via the second output gear 36, the counter gear mechanism 80, the output device 85, and the axles 90. When the decoupling mechanism 60 is in the non-transmitting state, the second rotating electrical machine 30 is decoupled from the output member 46 and the wheels W, and power is not transmitted therebetween. In the following description, the state where the decoupling mechanism 60 functions to "cut off power transmission between the second rotating electrical machine 30 and the output member 46 and the wheels W" is sometimes referred to as the "operating state" of the decoupling mechanism 60.

The direct coupling mechanism 70 switches the state of rotation of the three rotary elements of the differential gear unit 40 according to the state of the direct coupling mechanism 70. The direct coupling mechanism 70 switches between the direct coupling state where the three rotary elements of the differential gear unit 40 are rotated together and the non-direct coupling state where the three rotary elements of the differential gear unit 40 are allowed to have differential rotation. For example, the direct coupling mechanism 70 can also be formed by a normally open friction engagement device, a normally closed friction engagement device, a meshing engagement device, etc. For example, in the case where the direct coupling mechanism. 70 is formed by a normally open friction engagement device, the direct coupling mechanism 70 switches to the non-direct coupling state when a servo mechanism, such as a hydraulic cylinder, is not driven, and switches to the direct coupling state when the servo mechanism is driven.

In the non-direct coupling state, the three rotary elements of the differential gear unit 40 rotate at rotational speeds that are different from each other but have a fixed relationship according to the gear ratio $\lambda$ of the differential gear unit 40. The gear ratio $\lambda$ is the ratio of the number of teeth between the sun gear 41 and the ring gear 43 ([the number of teeth of the sun gear 41]/[the number of teeth of the ring gear 43]). In the direct coupling state, the three rotary elements of the differential gear unit 40 which rotate together rotate at the same speed. The direct coupling state can be attained by coupling any two of the three rotary elements of the differential gear unit 40 such that the two rotary elements rotate together. In this example, the direct coupling state is attained by coupling the sun gear 41 serving as the first rotary element E1 and the carrier 42 serving as the second rotary element E2. However, the direct coupling state may be attained by coupling the ring gear 43 serving as the third rotary element E3 and the first rotary element E1 or the second rotary element E2. In the following description, the state where the direct coupling mechanism 70 functions to "rotate the three rotary elements of the differential gear unit 40 together" is sometimes referred to as the "operating state" of the direct coupling mechanism 70.

As shown in FIG. 2, the control device 1 that controls the vehicle drive device 100 includes a first rotating electrical machine control unit 2, a second rotating electrical machine control unit 3, a fixing mechanism control unit 5, a decoupling mechanism control unit 6, and a direct coupling mechanism control unit 7. The first rotating electrical machine control unit 2 controls at least one of the rotational speed and output torque of the first rotating electrical machine 20. The second rotating electrical machine control unit 3 controls at least one of the rotational speed and output torque of the second rotating electrical machine 30. The fixing mechanism control unit 5 controls a drive mechanism (e.g., a servo mechanism, such as a hydraulic cylinder) of the fixing mechanism 50 to control the state (fixing state/non-fixing state) of the fixing mechanism 50. The decoupling mechanism control unit 6 controls a drive mechanism (e.g., a servo mechanism, such as a hydraulic cylinder) of the decoupling mechanism 60 to control the state (transmitting state/non-transmitting state) of the decoupling mechanism 60. The direct coupling mechanism control unit 7 controls a drive mechanism (e.g., a servo mechanism, such as a hydraulic cylinder) of the direct coupling mechanism 70 to control the state (direct coupling state/non-direct coupling state) of the direct coupling mechanism 70.

The present embodiment is mainly intended for the configuration in which an internal combustion engine control device (not shown) that controls at least one of the rotational speed and output torque of the internal combustion engine EG is provided separately. However, the present disclosure is not limited to this configuration, and the control device 1 may include an internal combustion engine control unit that controls the internal combustion engine EG.

As shown in FIG. 3, the control device 1 has at least a first drive mode and a second drive mode which can be switched by controlling the state of the fixing mechanism 50 and the decoupling mechanism 60. In the present embodiment, the control device 1 switchably has four drive modes, namely a first drive mode, a second drive mode, a third drive mode, and a fourth drive mode. In the case where the control device 1 further controls the state of the direct coupling mechanism 70 in addition to the fixing mechanism 50 and the decoupling mechanism 60, the control device 1 switchably has a total of six drive modes including a fifth drive mode and a sixth drive mode. In FIG. 3, any of the fixing mechanism 50, the decoupling mechanism 60, and the direct coupling mechanism 70 which is in the "operating state" is shown by white circle "○." As described above, for the fixing mechanism 50 and the direct coupling mechanism 70, the operating state is the state where the friction engagement device is engaged, and for the decoupling mechanism 60, the operating state is the state where the friction engagement device is disengaged. Each drive mode will be described below with reference to speed diagrams showing the operational state of the differential gear unit 40.

In each speed diagram, the ordinate represents the rotational speed of each rotary element. The range above "0" on the ordinate indicates positive rotation (the rotational speed is positive and the range below "0" indicates negative rotation (the rotational speed is negative). A plurality of parallel vertical lines indicate the rotary elements of the differential gear unit 40, and the intervals between the plurality of vertical lines indicating the rotary elements are determined according to the gear ratio λ of the differential gear unit 40. The rotational speeds of the first rotating electrical machine 20, the internal combustion engine EG, the output member 46, and the second rotating electrical machine 30 are shown by different symbols. The rotational speed of the second rotating electrical machine 30 is shown as converted to the rotational speed at the position of the output member 46 in the power transmission path. Symbol "X" schematically shows that a specific rotary element is held stationary with respect to the case 95.

Arrow "T1" indicates the output torque of the first rotating electrical machine 20, arrow "Te" indicates the output torque of the internal combustion engine EG which is transmitted via the input member 10, and arrow "To" indicates running resistance that is transmitted from the wheels W. Arrow "T2" indicates the output torque of the second rotating electrical machine 30. The directions of these arrows indicate the directions of the torque. Specifically, the upward arrows indicate torque in the positive direction, and the downward arrows indicate torque in the negative direction.

Figure 4:
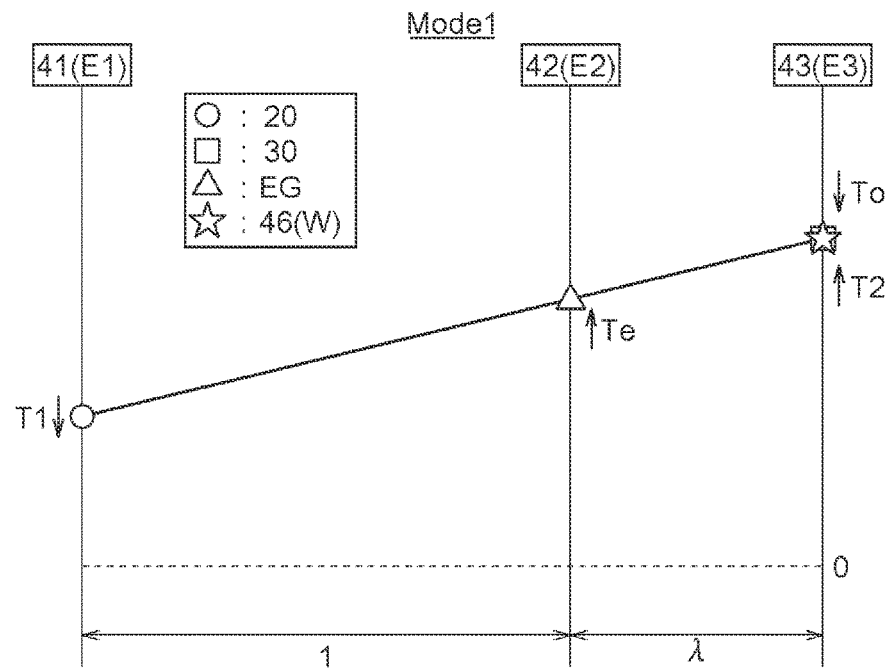
FIG. 4 is a speed diagram in a first drive mode.

As shown in FIG. 3, the first drive mode is attained with all of the fixing mechanism 50, the decoupling mechanism 60, and the direct coupling mechanism 70 being in the non-operating state. That is, the first drive mode is attained with the fixing mechanism 50 being in the non-fixing state, the decoupling mechanism 60 being in the transmitting state, and the direct coupling mechanism 70 being in the non-direct coupling state. As shown in FIG. 4, in the first drive mode, the internal combustion engine EG is controlled according to optimal fuel efficiency characteristics and outputs torque in the positive direction, and the input member 10 and the second rotary element E2 rotate at a rotational speed according to the rotational speed of the internal combustion engine EG. The output member 46 and the third rotary element E3 rotate at a rotational speed according to the vehicle speed. The first rotating electrical machine 20 coupled to the first rotary element E1 outputs torque in the negative direction to support the reaction force of the torque of the internal combustion engine EG. The differential gear unit 40 thus distributes a part of the torque of the internal combustion engine EG to the first rotating electrical machine 20 and transmits torque reduced relative to the torque of the internal combustion engine EG to the output member 46 and to the wheels W. The differential gear unit 40 functions as a power splitter. The ratio of the rotational speed of the input member 10 to the rotational speed of the output member 46 (the speed ratio) can be steplessly changed by adjusting the rotational speed and output torque of the first rotating electrical machine 20. The differential gear unit 40 functions also as a stepless shift device. The second rotating electrical machine 30 outputs torque in the positive direction so as to compensate for a shortage of a required driving force.

As described above, in the first drive mode, the rotational speed of the input member 10 is steplessly shifted and transmitted to the output member 46, and the torque of the second rotating electrical machine 30 is transmitted to the output member 46 and the wheels W. The first drive mode of the present embodiment can be called the "assisted stepless shift drive mode," or more specifically, the "assisted split drive mode."

Figure 5:
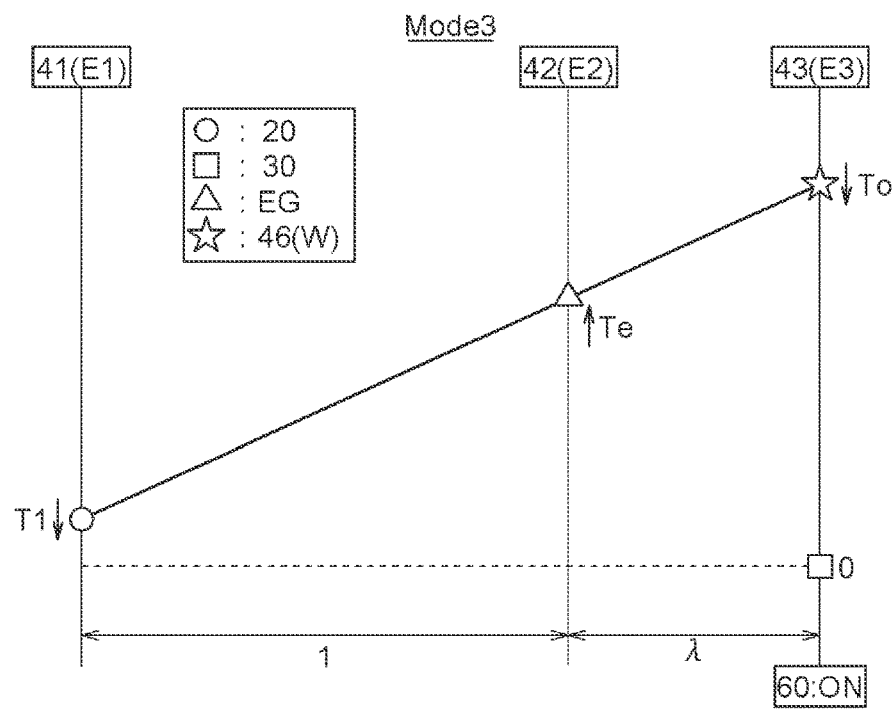
FIG. 5 is a speed diagram in a third drive mode.
Figure 6:
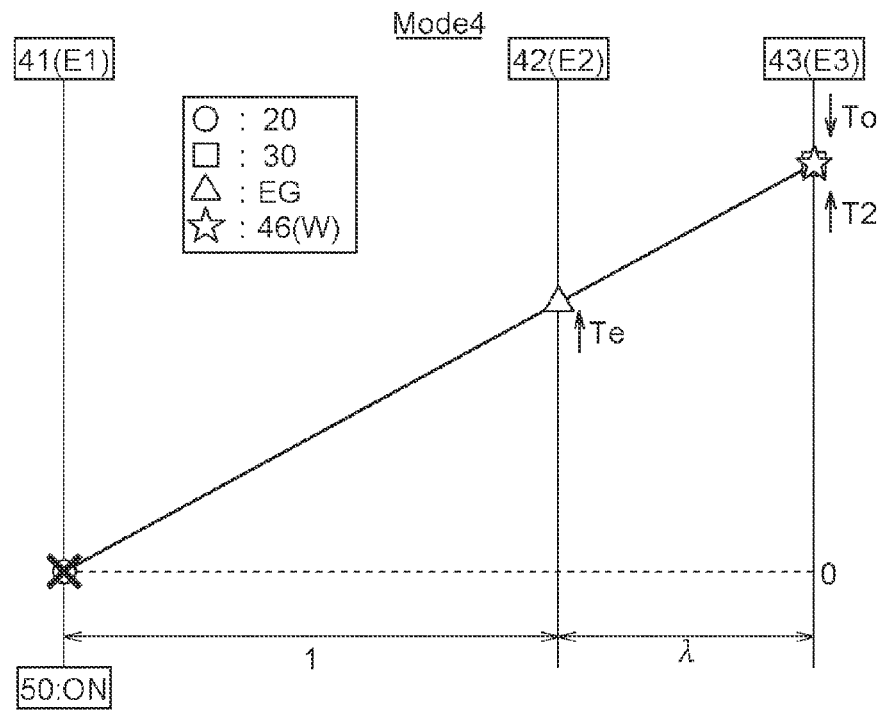
FIG. 6 is a speed diagram in a fourth drive mode.

As shown in FIG. 3, the third drive mode is attained with the fixing mechanism 50 and the direct coupling mechanism 70 being in the non-operating state and the decoupling mechanism 60 being in the operating state. That is, the third drive mode is attained with the fixing mechanism 50 being in the non-fixing state, the decoupling mechanism 60 being in the non-transmitting state, and the direct coupling mechanism 70 being in the non-direct coupling state. In the relationship with the first drive mode, the third drive mode is attained by switching the decoupling mechanism 60 in the first drive mode to the operating state, namely by switching the decoupling mechanism 60 from the transmitting state to the non-transmitting state. As shown in FIG. 5, in the third drive mode, the first rotary element E1 and the first rotating electrical machine 20, the second rotary element E2 and the internal combustion engine EG, and the third rotary element E3 and the output member 46 operate in a manner similar to that in the first drive mode. That is, in the third drive mode, the internal combustion engine EG is controlled according to the optimal fuel efficiency characteristics and outputs torque in the positive direction, and the input member 10 and the second rotary element E2 rotate at a rotational speed according to the rotational speed of the internal combustion engine EG. The output member 46 and the third rotary element E3 rotate at a rotational speed according to the vehicle speed. The first rotating electrical machine 20 coupled to the first rotary element E1 outputs torque in the negative direction to support the reaction force of the torque of the internal combustion engine EG. The differential gear unit 40 thus distributes a part of the torque of the internal combustion engine EG to the first rotating electrical machine 20 and transmits torque reduced relative to the torque of the internal combustion engine EG to the output member 46 and to the wheels W. The ratio of the rotational speed of the input member 10 to the rotational speed of the output member 46 (the speed ratio) can be steplessly changed by adjusting the rotational speed and output torque of the first rotating electrical machine 20. Unlike in the first drive mode, the second rotating electrical machine 30 is decoupled from the output member 46 and the wheels W by the decoupling mechanism 60 and is stopped.

As described above, in the third drive mode, the rotational speed of the input member 10 is steplessly shifted and transmitted to the output member 46 with the second rotating electrical machine 30 being decoupled from the output member 46 and the wheels W. The third drive mode of the present embodiment can be called the "unassisted stepless shift drive mode," or more specifically, the "unassisted split drive mode."

As shown in FIG. 3, the fourth drive mode is attained with the decoupling mechanism 60 and the direct coupling mechanism 70 being in the non-operating state and the fixing mechanism 50 being in the operating state. That is, the fourth drive mode is attained with the fixing mechanism 50 being in the fixing state, the decoupling mechanism 60 being in the transmitting state, arid the direct coupling mechanism 70 being in the non-direct coupling state. As shown in FIG.

6, in the fourth drive mode, the fixing mechanism 50 is in the fixing state and the first rotary element E1 and the first rotating electrical machine 20 are held stationary with respect to the case 95. Rotation of the input member 10 and the second rotary element E2 which rotate with the internal combustion engine EG is thus shifted according to the gear ratio λ of the differential gear unit 40 and transmitted to the third rotary element E3 and the output member 46. In the present embodiment, rotation of the input member 10 is increased in speed by a factor of (1+λ) and transmitted to the output member 46. The differential gear unit 40 functions as a constant shift device (in this example, a speed increasing device). The second rotating electrical machine 30 outputs torque in the positive direction so as to compensate for a shortage of a required driving force.

As described above, in the fourth drive mode, the rotational speed of the input member 10 is shifted according to the gear ratio λ of the differential gear unit 40 and transmitted to the output member 46, and the torque of the second rotating electrical machine 30 is transmitted to the output member 46 and the wheels W. The fourth drive mode of the present embodiment can be called "assisted parallel drive mode (shift speed)," or more specifically, "assisted parallel drive mode (acceleration speed)."

Figure 7:
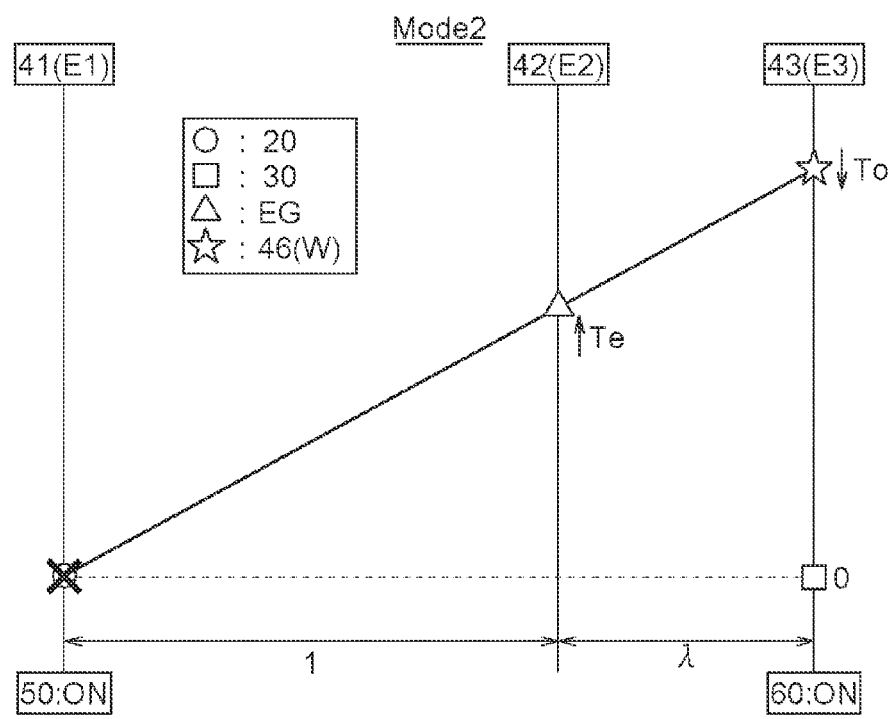
FIG. 7 is a speed diagram in a second drive mode.

As shown in FIG. 3, the second drive mode is attained with the fixing mechanism 50 and the decoupling mechanism 60 being in the operating state and the direct coupling mechanism 70 being in the non-operating state. That is, the second drive mode is attained with the fixing mechanism 50 being in the fixing state, the decoupling mechanism 60 being in the non-transmitting state, and the direct coupling mechanism 70 being in the non-direct coupling state. In the relationship with the fourth drive mode, the second drive mode is attained by switching the decoupling mechanism 60 in the fourth drive mode to the operating state, namely by switching the decoupling mechanism 60 from the transmitting state to the non-transmitting state. As shown in FIG. 7, in the second drive mode, the first rotary element E1 and the first rotating electrical machine 20, the second rotary element E2 and the internal combustion engine EG, and the third rotary element E3 and the output member 46 operate in a manner similar to that in the fourth drive mode. That is, in the second drive mode, the fixing mechanism 50 is in the fixing state and the first rotary element E1 and the first rotating electrical machine 20 are held stationary with respect to the case 95. Rotation of the input member 10 and the second rotary element E2 which rotate with the internal combustion engine EG is thus shifted according to the gear ratio λ of the differential gear unit 40 and transmitted to the third rotary element E3 and the output member 46. In the present embodiment, rotation of the input member 10 is increase in speed by a factor of (1+λ) and transmitted to the output member 46. Unlike in the fourth drive mode, the second rotating electrical machine 30 is decoupled from the output member 46 and the wheels W by the decoupling mechanism 60 and is stopped.

As described above, in the second drive mode, the rotational speed of the input member 10 is shifted according to the gear ratio λ of the differential gear unit 40 and transmitted to the output member 46 with the second rotating electrical machine 30 being decoupled from the output member 46 and the wheels W. The second drive mode of the present embodiment can be called the "unassisted parallel drive mode (shift speed)," or more specifically, "unassisted parallel drive mode (acceleration speed)."

Figure 8:
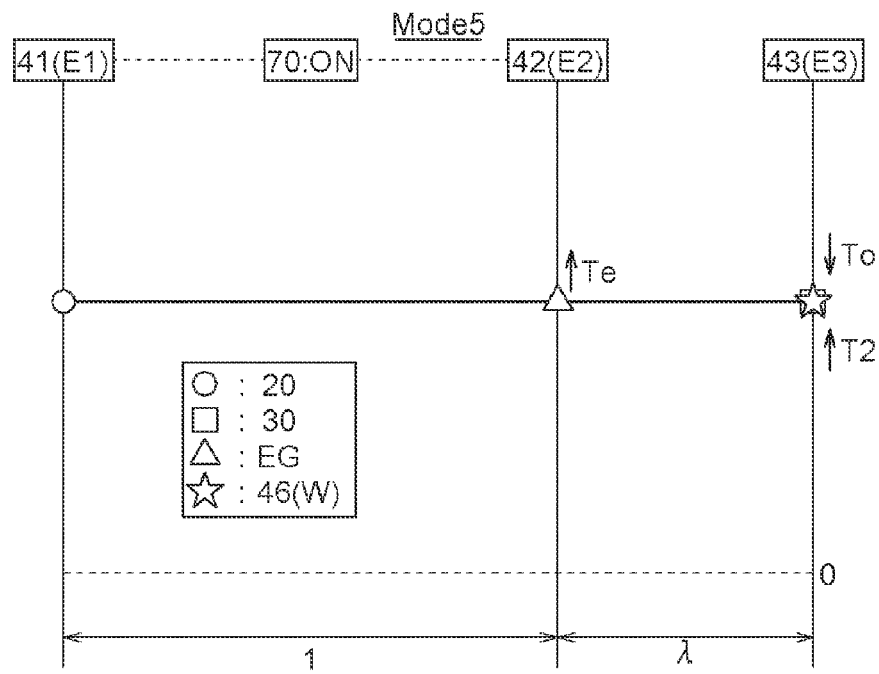
FIG. 8 is a speed diagram in a fifth drive mode.

As shown in FIG. 3, the fifth drive mode is attained with the fixing mechanism 50 and the decoupling mechanism 60 being in the non-operating state and the direct coupling mechanism 70 being in the operating state. That is, the fifth drive mode is attained with the fixing mechanism 50 being in the non-fixing state, the decoupling mechanism 60 being in the transmitting state, and the direct coupling mechanism 70 being in the direct coupling state. As shown in FIG. 8, in the fifth drive mode, the direct coupling mechanism 70 is in the direct coupling state and the three rotary elements of the differential gear unit 40 rotate together. Rotation of the input member 10 and the second rotary element E2 which rotate with the internal combustion engine EG is thus transmitted at the same rotational speed to the third rotary element E3 and the output member 46. The second rotating electrical machine 30 outputs torque in the positive direction so as to compensate for a shortage of a required driving force.

As described above, in the fifth drive mode, the rotational speed of the input member 10 is transmitted as it is to the output member 46, and the torque of the second rotating electrical machine 30 is transmitted to the output member 46 and the wheels W. The fifth drive mode of the present embodiment can be called the "assisted parallel drive mode (direct coupling speed)." In the present embodiment, the fifth drive mode corresponds to a lower speed than the fourth drive mode that is a similar assisted parallel drive mode.

Figure 9:
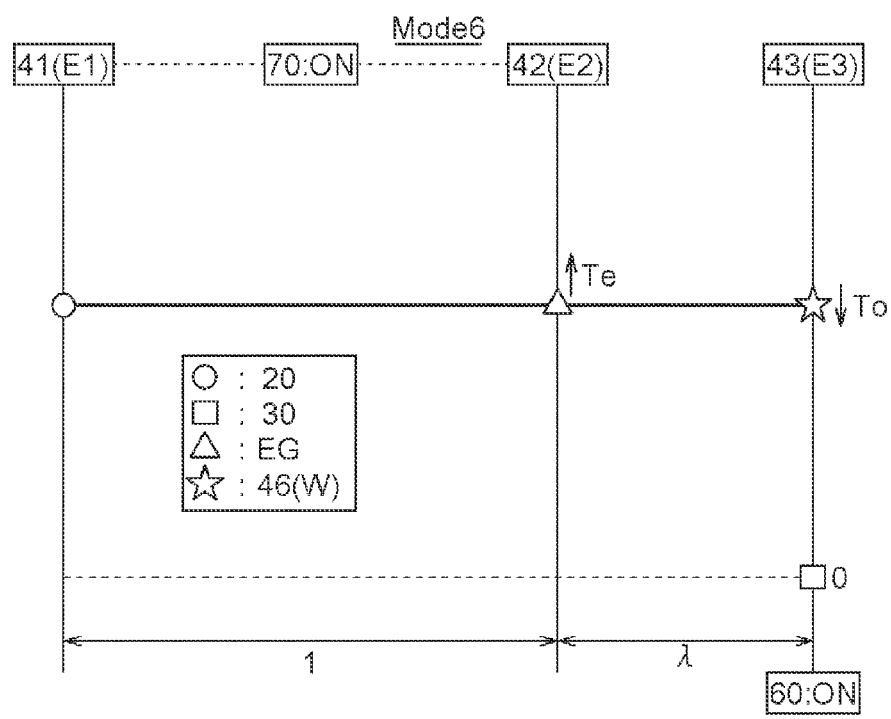
FIG. 9 is a speed diagram in a sixth drive mode.

As shown in FIG. 3, the sixth drive mode is attained with the decoupling mechanism 60 and the direct coupling mechanism 70 being in the operating state and the fixing mechanism 50 being in the non-operating state. That is, the sixth drive mode is attained with the fixing mechanism 50 being in the non-fixing state, the decoupling mechanism 60 being in the non-transmitting state, and the direct coupling mechanism 70 being in the direct coupling state. In the relationship with the fifth drive mode, the sixth drive mode is attained by switching the decoupling mechanism 60 in the fifth drive mode to the operating state, namely by switching the decoupling mechanism 60 from the transmitting state to the non-transmitting state. As shown in FIG. 9, in the sixth drive mode, the first rotary element E1 and the first rotating electrical machine 20, the second rotary element E2 and the internal combustion engine EG, and the third rotary element E3 and the output member 46 operate in a manner similar to that in the fifth drive mode. That is, in the sixth drive mode, the direct coupling mechanism 70 is in the direct coupling state and the three rotary elements of the differential gear unit 40 rotate together. Rotation of the input member 10 and the second rotary element E2 which rotate with the internal combustion engine EG is thus transmitted at the same rotational speed to the third rotary element E3 and the output member 46. Unlike in the fifth drive mode, the second rotating electrical machine 30 is decoupled from the output member 46 and the wheels W by the decoupling mechanism 60 and is stopped.

As described above, in the sixth drive mode, the rotational speed of the input member 10 is transmitted as it is to the output member 46 with the second rotating electrical machine 30 being decoupled from the output member 46 and the wheels W. The sixth drive mode of the present embodiment can be called the "unassisted parallel drive mode (direct coupling speed)." In the present embodiment, the sixth drive mode corresponds to a lower speed than the second drive mode that is a similar unassisted parallel drive mode.

Figure 10:
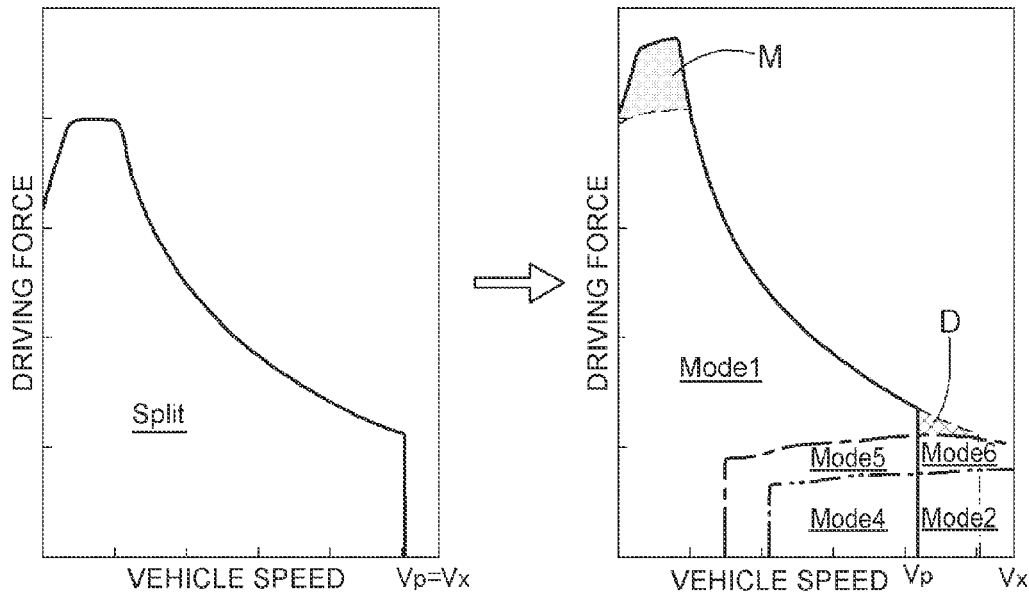
FIG. 10 shows driving force charts showing traveling characteristics in each drive mode.

FIG. 10 shows driving force charts showing the relationship between the drive mode to be attained and the driving force that can be output according to the vehicle speed. The left chart in FIG. 10 is shown for comparison and is a driving force chart in a split drive mode, which corresponds to the first drive mode in the present embodiment, in a drive device (hereinafter referred to as the "comparative drive device 100R") that does not include the fixing mechanism 50, the decoupling mechanism 60, and the direct coupling mechanism 70. The right chart in FIG. 10 is a driving force chart in each drive mode (except for the third drive mode) in the vehicle drive device 100 of the present embodiment. Thin dashed line in the right chart in FIG. 10 shows the driving force chart in the split drive mode in the comparative drive device 100R for ease of comparison.

As shown in the right chart in FIG. 10, in the vehicle drive device 100 of the present embodiment, the first drive mode covers a region that is a vehicle speed region equal to or lower than a maximum converted vehicle speed Vp that is determined in proportion to the maximum rotational speed that can be output from the second rotating electrical machine 30, and is on the high driving force side. The fourth drive mode covers a region that is a vehicle speed region equal to or lower than the maximum converted vehicle speed Vp and is on the low driving force side. The fifth drive mode covers a region that is a vehicle speed region equal to or lower than the maximum converted vehicle speed Vp and is a boundary region between the region where the first drive mode is attained and the region where the fourth drive mode is attained. Since the low-speed, high-torque rotating electrical machine 30 is used in the vehicle drive device 100 of the present embodiment, the driving force that can be output in the low vehicle speed region is increased as compared to the comparative drive device 100R (see the region M). In this example, in the vehicle drive device 100 of the present embodiment, the driving force in the low vehicle speed region is increased by about 20% or more as compared to the comparative drive device 100R. A sufficient driving force can thus be ensured even when the vehicle travels at low vehicle speeds.

In the vehicle speed region higher than the maximum converted vehicle speed Vp, the rotational speed of the output member 46 is higher than the maximum converted rotational speed, at the position of the output member 46, of the second rotating electrical machine 30 (the rotational speed that is determined in proportion to the maximum rotational speed that can be output from the second rotating electrical machine 30). The second drive mode or the sixth drive mode, which is specific to the vehicle drive device 100 of the present embodiment, is attained when the vehicle travels at such specific high vehicle speeds. The sixth drive mode on the lower speed side covers a region on the higher driving force side than the second drive mode on the higher speed side. As described below, the third drive mode specific to the vehicle drive device 100 of the present embodiment is also attained when the vehicle travels at the specific high vehicle speeds (in the vehicle speed region equal to or higher than the maximum converted vehicle speed Vp). In the vehicle drive device 100 of the present embodiment, the vehicle speed region that is higher than the maximum converted vehicle speed Vp and that is not covered by the first drive mode is covered by the second drive mode and the sixth drive mode. In this case, a region that is covered by the split drive mode of the comparative drive device 100R and that is not covered by the second drive mode and the sixth drive mode of the vehicle drive device 100 of the present embodiment is a very limited region (see the region D).

In the second drive mode and the sixth drive mode which are attained when the vehicle travels at high vehicle speeds (in this example, particularly when the vehicle travels at the specific high vehicle speeds), the decoupling mechanism 60 is in the non-transmitting state, and the second rotating electrical machine 30 is decoupled from the output member 46 and the wheels W. The vehicle can therefore travel at high vehicle speeds regardless of the restriction by the maximum rotational speed that can be output from the second rotating electrical machine 30. It can be understood from the right chart in FIG. 10 that the maximum vehicle speed Vx is present in a vehicle speed region higher than the maximum converted vehicle speed Vp that is determined in proportion to the maximum rotational speed of the second rotating electrical machine 30. This allows the vehicle to travel at higher vehicle speeds without increasing the maximum rotational speed of the second rotating electrical machine 30. For example, in the second drive mode, the fixing mechanism 50 is in the fixing state so that the first rotating electrical machine 20 is held stationary, and the rotational speed of the input member 10 is increased and transmitted to the output member 46 to move the vehicle. This can improve fuel consumption at high vehicle speeds.

Since the maximum rotational speed of the second rotating electrical machine 30 need not be increased, the following effects can also be obtained. First, for example, there is no need to increase the centrifugal strength of the second rotor 32 by, e.g., increasing the thickness of bridges that support embedded permanent magnets. Accordingly, torque characteristics of the second rotating electrical machine 30 can be satisfactorily maintained. There is no need to increase the withstand voltage of the inverter device for the second rotating electrical machine 30 so that the second rotating electrical machine 30 can be driven to rotate at high rotational speeds. Moreover, since the maximum rotational speed of the second rotating electrical machine 30 is reduced, a counter electromotive force that is generated when the second rotating electrical machine 30 is driven is not so large. An increase in loss can therefore be restrained.

In the second drive mode that is especially suitable as a drive mode at high vehicle speeds in the present embodiment, the fixing mechanism 50 is in the fixing state and the first rotating electrical machine 20 is held stationary with respect to the case 95. Accordingly, the first rotating electrical machine 20 cannot generate electricity. Moreover, the decoupling mechanism 60 is in the non-transmitting state and the second rotating electrical machine 30 is decoupled from the output member 46 and the wheels W. Accordingly, the second rotating electrical machine 30 cannot generate electricity, either. When the vehicle is traveling, auxiliaries such as an electric pump and a compressor, on-board electronic equipment such as a navigation device and audio equipment, etc. consume electric power stored in the electricity storage device B. Accordingly, in the second drive mode, the electric power balance is necessarily negative, and the amount of electricity stored in the electricity storage device B decreases gradually. In the present embodiment, specific mode transition control is performed in such a case to shift the drive mode to the third drive mode under certain conditions. The specific mode transition control will be described below with reference to the flowchart in FIG. 11 and the timing chart in FIG. 12.

Figure 11:
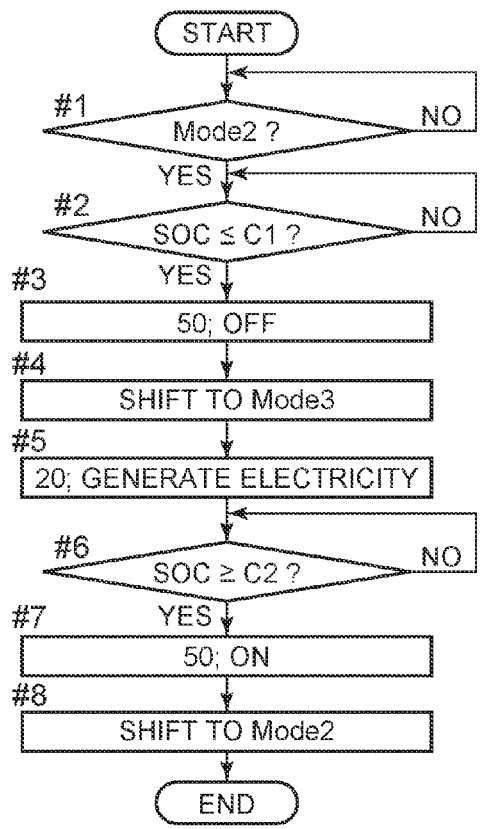
FIG. 11 is a flowchart of specific mode transition control.
Figure 12:
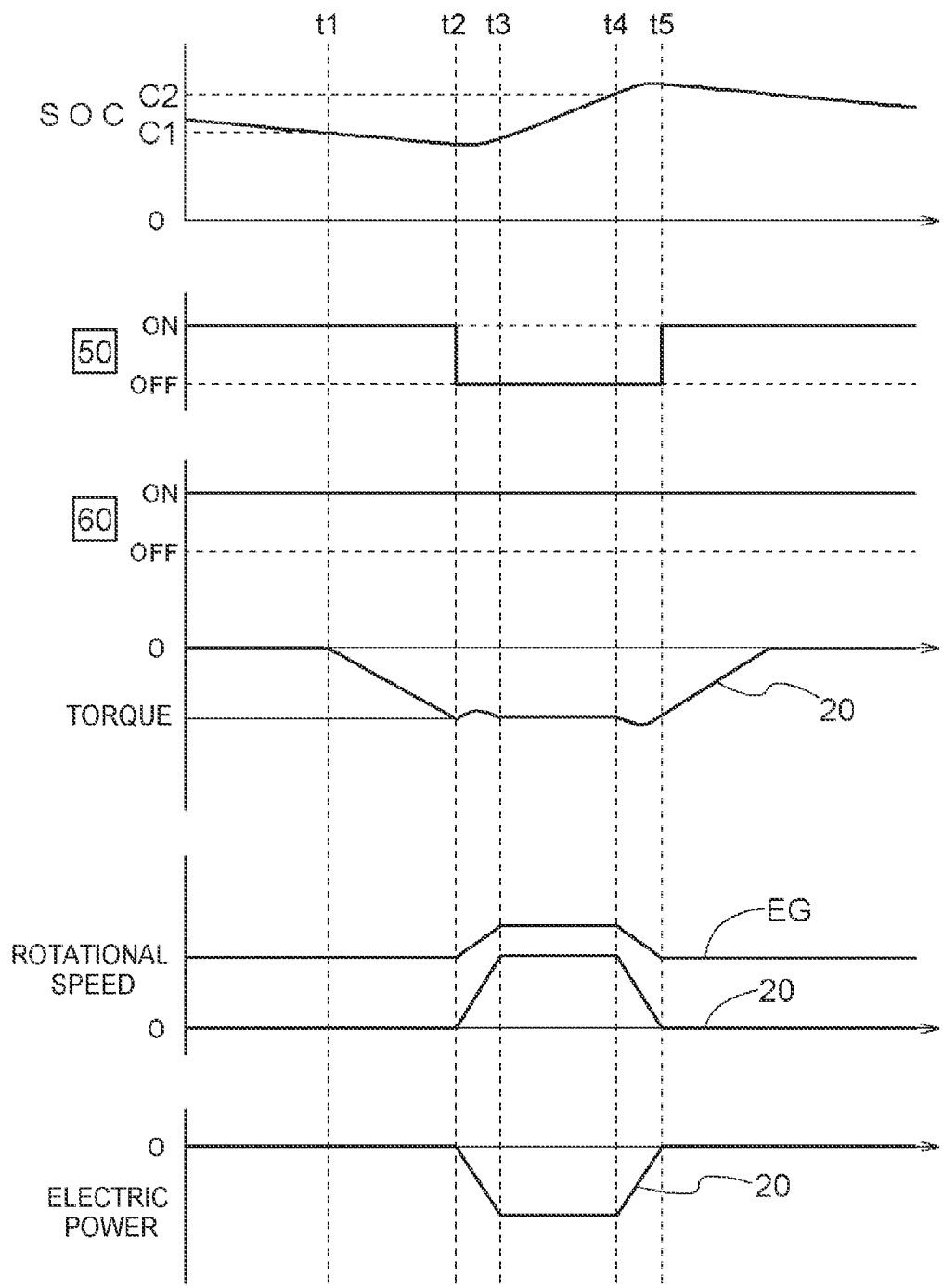
FIG. 12 is a timing chart of the specific mode transition control.

As shown in FIG. 11, the specific mode transition control is triggered when the current drive mode is the second drive mode (Step #1: Yes). In the specific mode transition control, when the vehicle is traveling in the second drive mode, it is first determined if the amount of electricity (State Of Charge, SOC) stored in the electricity storage device B is equal to or smaller than a preset first reference charge value C1 (#2). The first reference charge value C1 is a threshold value that is used to determine that the amount of electricity stored in the electricity storage device B has decreased to a low charge state. For example, it is preferable to set the first reference charge value C1 to a value in the range of 5% to 50% (preferably 20% to 30%) of full charge. In the present embodiment, the first reference charge value C1 corresponds to the "reference charge value." If the amount of electricity stored in the electricity storage device B is equal to or smaller than the first reference charge value C1 (#2: Yes, time t1), the first rotating electrical machine 20 outputs negative torque that supports the reaction force of the torque of the internal combustion engine EG (t2), and the fixing mechanism 50 is then switched to the non-operating state (#3). The fixing mechanism 50 is thus switched to the non-fixing state, and the drive mode is shifted to the third drive mode (#4).

When the vehicle is traveling in the third drive mode, the rotational speeds of the internal combustion engine EG and the first rotating electrical machine 20 are increased (t2 to t3). In this state, the first rotating electrical machine 20 is caused to output negative torque while rotating forward, thereby generating electricity by the torque of the internal combustion engine EG (#5, t3 to t4). While the first rotating electrical machine 20 is generating electricity, it is determined if the amount of electricity stored in the electricity storage device B is equal to or larger than a second reference charge value C2 that is preset to a value higher than the first reference charge value C1 (#6). The second reference charge value C2 is a threshold value that is used to determine that the amount of electricity stored in the electricity storage device B has increased to a full charge state or is approaching the full charge state. For example, it is preferable to set the second reference charge value C2 to a value in the range of 60% to 100% (preferably 80% to 95%) of full charge. if the amount of electricity stored in the electricity storage device B is equal to or larger than the second reference charge value C2 (#6: Yes, t4), the rotational speeds of the internal combustion engine EG and the first rotating electrical machine 20 are reduced to their original values (t4 to t5). With the rotational speed of the first rotating electrical machine 20 approaching zero, the fixing mechanism 50 is switched to the operating state (#7, t5). The fixing mechanism 50 is thus switched to the fixing state, and the drive mode returns to the second drive mode (#8).

As described above, when the amount of electricity stored in the electricity storage device B decreases to the first reference charge value C1 or less while the vehicle is traveling in the second drive mode, the vehicle drive device 100 of the present embodiment switches the fixing mechanism 50 to the non-fixing state to switch the drive mode to the third drive mode to cause the first rotating electrical machine 20 to generate electricity. This can avoid a shortage in the amount of electricity stored in the electricity storage device B when the vehicle travels at the specific high vehicle speeds. When the amount of electricity stored in the electricity storage device B increases to the second reference charge value C2 or more while the vehicle is traveling in the third drive mode, the vehicle drive device 100 switches the fixing mechanism 50 to the fixing state to switch the drive mode to the second drive mode, so that the vehicle travels with the first rotating electrical machine 20 being held stationary. Fuel consumption at the specific high vehicle speeds can thus be improved in the case where a sufficient amount of electricity remains in the electricity storage device B.

[Other Embodiments]

Figure 13:
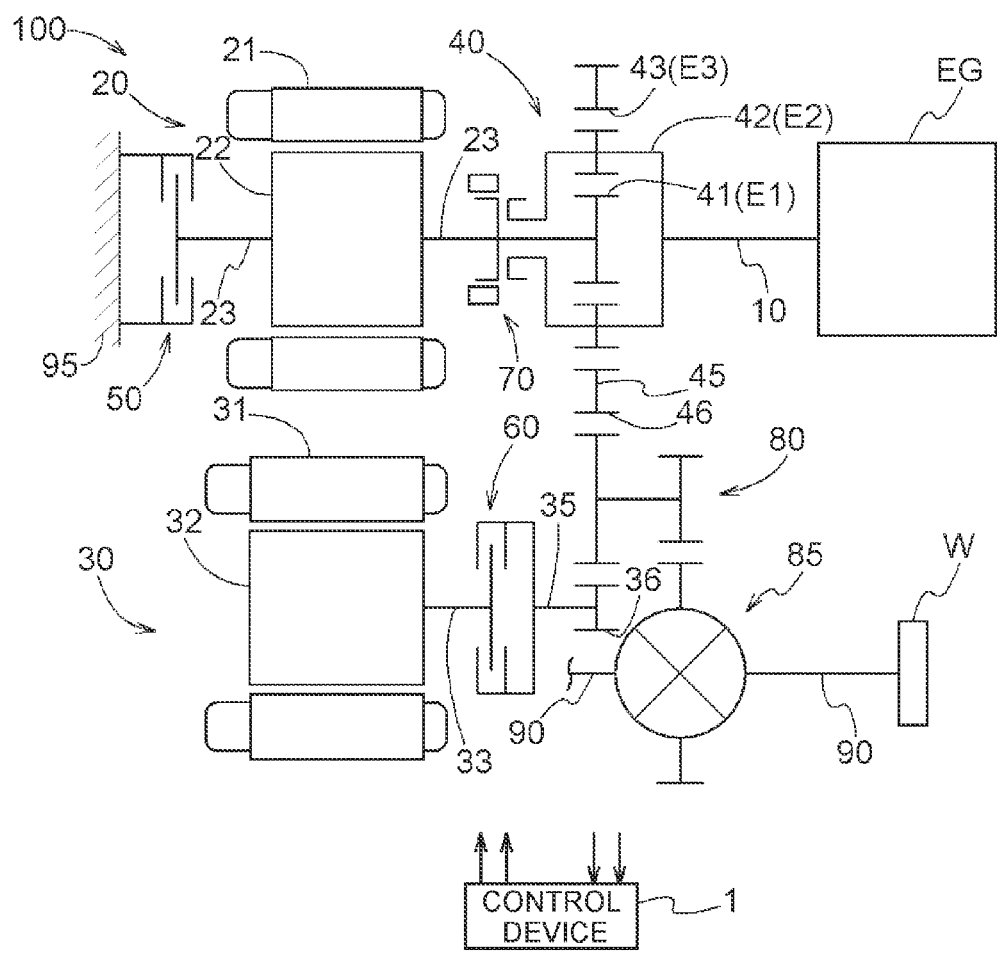
FIG. 13 is a skeleton diagram of a vehicle drive device according to another embodiment.

(1) The above embodiment is described with respect to the example in which each of the fixing mechanism 50, the decoupling mechanism 60, and the direct coupling mechanism 70 is formed by a friction engagement device. However, the present disclosure is not limited to this configuration. For example, at least one of the fixing mechanism 50, the decoupling mechanism 60, and the direct coupling mechanism 70 may be formed by a meshing engagement device. FIG. 13 shows, as an example, the configuration of the vehicle drive device 100 in which the direct coupling mechanism 70 is formed by a meshing engagement device. In this case, synchronous control that is performed to switch the direct coupling mechanism 70 between the direct coupling state and the non-direct coupling state can be performed not only by control of the rotational speed of the first rotating electrical machine 20 but also by control of the engagement pressure of the friction engagement device that forms the fixing mechanism 50. In the case where each of the fixing mechanism 50, the decoupling mechanism 60, and the direct coupling mechanism 70 is formed by a friction engagement device, each of the friction engagement devices may be either a normally open friction engagement device or a normally close friction engagement device.

Figure 14:
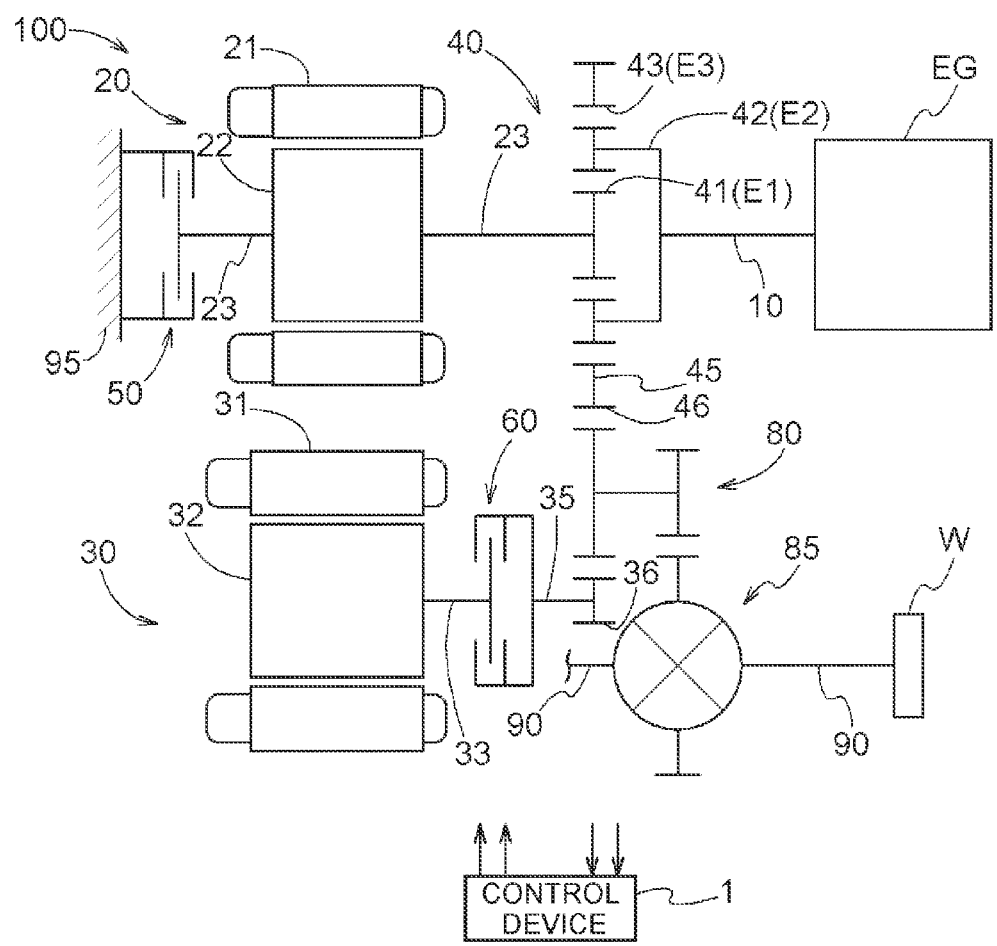
FIG. 14 is a skeleton diagram of a vehicle drive device according to still another embodiment.

(2) The above embodiment is described with respect to the configuration in which the vehicle drive device 100 further includes the direct coupling mechanism 70 in addition to the fixing mechanism 50 and the decoupling mechanism 60. However, the present disclosure is not limited to this configuration. For example, as shown in FIG. 14, the vehicle drive device 100 may not include the direct coupling mechanism 70. In this case, for example, as shown in FIG. 15, the vehicle drive device 100 may switchably have four drive modes, namely the first drive mode to the fourth drive mode.

(3) The above embodiment is described with respect to the configuration in which the control device 1 switchably has six drive modes, namely the first drive mode to the sixth drive mode. However, the present disclosure is not limited to this configuration. The control device 1 doesn't have to switchably have at least one of the four drive modes other than the first drive mode and the second drive mode. For example, as shown in FIG. 16, the control device 1 may switchably have five drive modes, namely the first drive mode to the third drive mode, the fifth drive mode, and the sixth drive mode. For example, as shown in FIG. 17, the control device 1 may switchably have five drive modes, namely the first drive mode, the second drive mode, and the fourth to sixth drive modes. For example, as shown in FIG. 18, the control device 1 may switchably have four drive modes, namely the first drive mode, the second drive mode, the fifth drive mode, and the sixth drive mode. In these cases, the vehicle drive device 100 doesn't have to include the direct coupling mechanism 70, and in this case, the control device 1 switchably has three or two drive modes except for the fifth drive mode and the sixth drive mode in each configuration. FIG. 19 shows an example in which the control device 1 switchably has only two drive modes, namely the first drive mode and the second drive mode.

Figure 20:
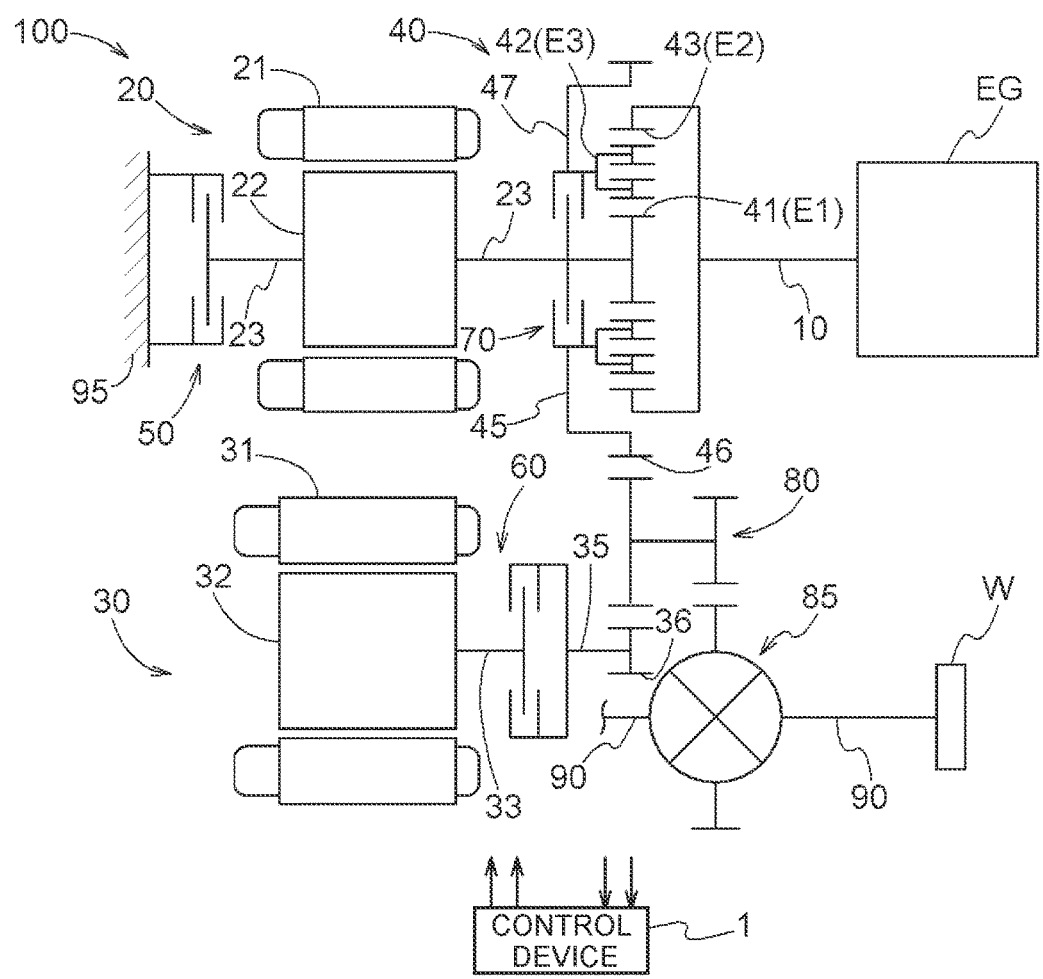
FIG. 20 is a skeleton diagram of a vehicle drive device according to a yet further embodiment.

(4) The above embodiment is described with respect to the example in which the differential gear unit 40 is formed by a single-pinion type planetary gear mechanism. However, the present disclosure is not limited to this configuration. For example, as shown in FIG. 20, the differential gear unit 40 may be formed by a double-pinion type planetary gear mechanism. In the example of FIG. 20, the ring gear 43 serving as the second rotary element E2 is drivingly coupled to the input member 10, and the carrier 42 serving as the third rotary element E3 is drivingly coupled to the output member 46. The output member 46 is formed as an external output gear formed in the outer peripheral surface of an annular disc-like carrier coupling member 47 coupled to the carrier 42.

(5) The above embodiment is described with respect to the configuration in which the order of the rotational speeds of the three rotary elements of the differential gear unit 40 are the first rotary element E1, the second rotary element E2, and the third rotary element E3. However, the present disclosure is not limited to this configuration. For example, the order of the rotational speeds of the three rotary elements may be the first rotary element E1, the third rotary element E3, and the second rotary element E2.

(6) The above embodiment is described with respect to the configuration in which a low-speed, high-torque rotating electrical machine is used as the second rotating electrical machine 30. However, the present disclosure is not limited to this configuration. For example, a low rotational speed and high torque may be achieved by, e.g., disposing a speed reduction mechanism in the power transmission path from the second rotating electrical machine 30 to the wheels W. In this case, since a low-torque second rotating electrical machine 30 can be used, the size of the second rotating electrical machine 30 can be reduced as compared to the case where such a speed reduction mechanism is not disposed.

(7) The above embodiment is described with respect to the configuration in which the first rotating electrical machine 20 and the second rotating electrical machine 30 are disposed so that the region where the first rotating electrical machine 20 is disposed and the region where the second rotating electrical machine 30 is disposed overlap each other in the axial direction. However, the present disclosure is not limited to this configuration. For example, the first rotating electrical machine 20 and the second rotating electrical machine 30 may be arranged coaxially. For example, the input member 10, the first rotating electrical machine 20, the differential gear unit 40, and the second rotating electrical machine 30 may be arranged coaxially in this order from the internal combustion engine EG side.

The configuration disclosed in each embodiment described above (including the above embodiment and the other embodiments; the same applies to the following description) may be used in combination with any of the configurations disclosed in the remaining embodiments unless inconsistency arises.

It should be understood that, regarding other configurations as well, the embodiments disclosed herein are by way of example only in all respects. A person skilled in the art can therefore make various modifications as appropriate without departing from the spirit and scope of the present disclosure.

[Summary of Embodiments]

In summary, the vehicle drive device according to the present disclosure preferably has the following configurations.

A control device (1) controls a vehicle drive device (100), the vehicle drive device (100) including an input member (10) that is drivingly coupled to an internal combustion engine (EG), an output member (46) that is drivingly coupled to wheels (W), a first rotating electrical machine (20), a second rotating electrical machine (30) that is drivingly coupled to the output member (46), a differential gear unit (40) having three rotary elements, which are a first rotary element (E1) that is drivingly coupled to the first rotating electrical machine (20), a second rotary element (E2) that is drivingly coupled to the input member (10), and a third rotary element (E3) that is drivingly coupled to the output member (46), a fixing mechanism (50) that switches between a fixing state where the first rotary element (E1) is held stationary with respect to a non-rotary member (5) and a non-fixing state where the first rotary element (E1) is allowed to rotate, and a decoupling mechanism (60) that switches between a transmitting state where power is transmitted between the second rotating electrical machine (30) and the output member (46) and a non-transmitting state where power is not transmitted between the second rotating electrical machine (30) and the output member (46). The control device (1) switchably has a first drive mode (Mode1) which is attained with the fixing mechanism (50) being in the non-fixing state and in which a rotational speed of the input member (10) is steplessly shifted and transmitted to the output member (46) and torque of the second rotating electrical machine (30) is transmitted to the output member (46), and a second drive mode (Mode2) which is attained with the fixing mechanism (50) being in the fixing state and the decoupling mechanism (60) being in the non-transmitting state and in which, with the second rotating electrical machine (30) being decoupled from the output member (46), the rotational speed of the input member (10) is shifted according to a gear ratio ($\lambda$) of the differential gear unit (40) and transmitted to the output member (46).

In this configuration, the vehicle drive device including the differential gear unit having the three rotary elements to which the first rotating electrical machine, the input member, and the output member are drivingly coupled additionally includes the fixing mechanism and the decoupling mechanism. The drive mode can be switched between the first drive mode and the second drive mode by switching the state of the fixing mechanism and the decoupling mechanism (the fixing state/non-fixing state of the fixing mechanism, the transmitting state/non-transmitting state of the decoupling mechanism). A vehicle can thus travel with the drive mode being switched between the first drive mode and the second drive mode according to the traveling state of the vehicle. In this case, the second drive mode can be attained by using the fixing mechanism having a simpler structure than the decoupling mechanism.

Since the vehicle drive device includes the decoupling mechanism that decouples the second rotating electrical machine from the output member when in the non-transmitting state, the speed reduction ratio from the second rotating electrical machine to the output member or the wheels can be set appropriately or a low-speed, high-torque second rotating electrical machine can be used. Accordingly, in the first drive mode, a sufficient driving force can be ensured even when the vehicle travels at low vehicle speeds.

For example, by decoupling the second rotating electrical machine while the vehicle is traveling at relatively high speeds, the vehicle can travel at higher vehicle speeds regardless of a restriction by a maximum rotational speed that can be output from the second rotating electrical machine. Moreover, by attaining the second drive mode when the vehicle travels at relatively high speeds at which the first drive mode is not efficient, the fixing mechanism is switched to the fixing state, and torque of the internal combustion engine transmitted to the input member can be transmitted directly to the output member without passing through the first rotating electrical machine. The vehicle can thus travel efficiently.

This configuration can thus ensure the driving force when the vehicle travels at low vehicle speeds and improve fuel consumption when the vehicle travels at high vehicle speeds.

According to one aspect, it is preferable that the control device (1) further switchably have a third drive mode (Mode3) which is attained with the fixing mechanism (50) being in the non-fixing state and the decoupling mechanism (60) being in the non-transmitting state and in which, with the second rotating electrical machine (30) being decoupled from the output member (46), the rotational speed of the input member (10) is steplessly shifted and transmitted to the output member (46).

In this configuration, the vehicle can travel with the drive mode being switched among the first drive mode, the second drive mode, and the third drive mode according to the traveling state of the vehicle. In the third drive mode that is additionally switchably included in this configuration, as compared to the second drive mode, the fixing mechanism is switched from the fixing state, so that the first rotating electrical machine is allowed to rotate. The first rotating electrical machine can thus be made to generate electricity by using the torque of the internal combustion engine transmitted to the input member. As compared to the first drive mode, the decoupling mechanism is switched to the non-transmitting state, so that the second rotating electrical machine can be decoupled from the output member. This can avoid dragging of the second rotating electrical machine and improve fuel consumption in, e.g., such a situation that torque assist by the second rotating electrical machine is not required while the vehicle is traveling in the first drive mode.

According to one aspect, it is preferable that the control device (1) further switchably have a fourth drive mode (Mode4) which is attained with the fixing mechanism (50) being in the fixing state and in which the rotational speed of the input member (10) is shifted according to the gear ratio ($\lambda$) of the differential gear unit (40) and transmitted to the output member (46) and the torque of the second rotating electrical machine (30) is transmitted to the output member (46).

In this configuration, the vehicle can travel with the drive mode being switched among the first drive mode, the second drive mode, and the fourth drive mode according to the traveling state of the vehicle. In the fourth drive mode that is additionally switchably included in this configuration, as compared to the second drive mode, the decoupling mechanism is switched to the transmitting state, so that the second rotating electrical machine can be switched from the state where the second rotating electrical machine is decoupled from the output member. The vehicle can thus travel by using the torque of the second rotating electrical machine in addition to the torque of the internal combustion engine transmitted to the input member.

According to one aspect, it is preferable the vehicle drive device (100) further include a direct coupling mechanism (70) that switches between a direct coupling state where the three rotary elements of the differential gear unit (40) are rotated together and a non-direct coupling state where the three rotary elements of the differential gear unit (40) are allowed to have differential rotation, and the control device (1) further switchably have a fifth drive mode (Mode5) which is attained with the direct coupling mechanism (70) being in the direct coupling state and in which the rotational speed of the input member (10) is transmitted as it is to the output member (46) and the torque of the second rotating electrical machine (30) is transmitted to the output member (46), and a sixth drive mode (Mode6) which is attained with the direct coupling mechanism (70) being in the direct coupling state and the decoupling mechanism (60) being in the non-transmitting state and in which, with the second rotating electrical machine (30) being decoupled from the output member (46), the rotational speed of the input member (10) is transmitted as it is to the output member (46).

In this configuration, the drive mode can be switched between the first drive mode and the fifth drive mode by switching the fixing state/non-fixing state of the fixing mechanism and the direct coupling state/non-direct coupling state of the direct coupling mechanism. The vehicle can travel with the drive mode being switched between the first drive mode and the fifth drive mode according to the traveling state of the vehicle. In the case where the control device further switchably has the fourth drive mode, the drive mode can be switched among the first drive mode, the fourth drive mode, and the fifth drive mode. The vehicle can travel with the drive mode being switched among the first drive mode, the fourth drive mode, and the fifth drive mode according to the traveling state of the vehicle. In this case, in particular, the fourth drive mode and the fifth drive mode can be considered to be two shift speeds of what is called a parallel drive mode, and a preferable driving state can be easily attained by selecting a drive mode that is preferred in terms of fuel consumption, in terms of ensuring a driving force, etc. In all of those drive modes, the second rotating electrical machine can be decoupled from the output member by switching the decoupling mechanism to the non-transmitting state, and a maximum vehicle speed can be set without being restricted by the maximum rotational speed of the second rotating electrical machine.

According to one aspect, it is preferable that, in the vehicle drive device (100), a maximum converted rotational speed at a position of the output member (46), which is determined in proportion to the maximum rotational speed that can be output from the second rotating electrical machine (30), be set to a value lower than an actual maximum rotational speed of the output member (46), and the second drive mode (Mode2) be attained when a vehicle travels at specific high vehicle speeds at which a rotational speed of the output member (46) is higher than the maximum converted rotational speed.

In this configuration, the second drive mode is attained by switching the decoupling mechanism to the non-transmitting state when the vehicle travels at the specific high vehicle speeds. This allows the vehicle to actually travel at higher vehicle speeds by using the second rotating electrical machine whose maximum rotational speed is set to a relatively low value.

According to one aspect, it is preferable that the vehicle drive device (100) be connected to an electricity storage device (B) that supplies electric power to at least one of the first rotating electrical machine (20) and the second rotating electrical machine (30) and that stores therein electric power generated by at least one of the first rotating electrical machine (20) and the second rotating electrical machine (30), the control device (1) further switchably have a third drive mode (Mode3) which is attained with the fixing mechanism (50) being in the non-fixing state and the decoupling mechanism (60) being in the non-transmitting state and in which, with the second rotating electrical machine (30) being decoupled from the output member (46), the rotational speed of the input member (10) is steplessly shifted and transmitted to the output member (46), and when an amount of electricity (SOC) stored in the electricity storage device (B) decreases to a value equal to or lower than a reference charge value (C1) while the vehicle is traveling in the second drive mode (Mode2), the control device (1) switch the fixing mechanism (50) to the non-fixing state to switch the drive mode to the third drive mode (Mode3) so as to cause the first rotating electrical machine (20) to generate electricity.

In this configuration, a shortage in the amount of electricity stored in the electricity storage device can be avoided when the vehicle travels in the second drive mode in which neither the first rotating electrical machine and the second rotating electrical machine can generate electricity and thus the amount of electricity stored in the electricity storage device gradually decreases.

According to one aspect, it is preferable that, in the vehicle drive device (100), an order of rotational speeds of the three rotary elements of the differential gear unit (40) be the first rotary element (E1), the second rotary element (E2), and the third rotary element (E3).

In this configuration, the rotational speed of the input member is increased and transmitted to the output member in the second drive mode. This can improve fuel consumption at high vehicle speeds. The same applies to the third drive mode in the configuration in which the control device further switchably has the third drive mode.

For example, in the configuration in which the vehicle drive device further includes the direct coupling mechanism and the control device further switchably has the fifth drive mode and the sixth drive mode, a larger driving force can be output in these drive modes as compared to the configuration in which the order of the rotational speeds of the second rotary element and the third rotary element is reversed. The vehicle can therefore travel with high torque in a high vehicle speed region.

The vehicle drive device according to the present disclosure need only have at least one of the effects described above.

INDUSTRIAL APPLICABILITY

For example, the technique according to the present disclosure is applicable to control devices that control a vehicle drive device for driving a vehicle.

The invention claimed is:
1. A control device that controls a vehicle drive device, the vehicle drive device including
an input that is drivingly coupled to an internal combustion engine,
an output that is drivingly coupled to wheels,
a first rotating electrical machine,
a second rotating electrical machine that is drivingly coupled to the output,
a differential gear unit having three rotary elements, which are a first rotary element that is drivingly coupled to the first rotating electrical machine, a second rotary element that is drivingly coupled to the input, and a third rotary element that is drivingly coupled to the output,
a fixing mechanism that is configured to switch between a fixing state where the first rotary element is held stationary with respect to a non-rotary member and a non-fixing state where the first rotary element is allowed to rotate, and
a decoupling mechanism that is configured to switch between a transmitting state where power is transmitted between the second rotating electrical machine and the output and a non-transmitting state where power is not transmitted between the second rotating electrical machine and the output, wherein the control device switchably has
a first drive mode which is attained with the fixing mechanism being in the non-fixing state and in which a rotational speed of the input is steplessly shifted and transmitted to the output and torque of the second rotating electrical machine is transmitted to the output,
a second drive mode which is attained with the fixing mechanism being in the fixing state and the decoupling mechanism being in the non-transmitting state and in which, with the second rotating electrical machine being decoupled from the output, the rotational speed of the input is shifted according to a gear ratio of the differential gear unit and transmitted to the output, and
a third drive mode which is attained with the fixing mechanism being in the non-fixing state and the decoupling mechanism being in the non-transmitting state and in which, with the second rotating electrical machine being decoupled from the output, the rotational speed of the input is steplessly shifted and transmitted to the output.

2. The control device according to claim 1, wherein
the control device further switchably has a fourth drive mode which is attained with the fixing mechanism being in the fixing state and in which the rotational speed of the input is shifted according to the gear ratio of the differential gear unit and transmitted to the output and the torque of the second rotating electrical machine is transmitted to the output.

3. The control device according to claim 2, wherein
the vehicle drive device further includes a direct coupling mechanism that is configured to switch between a direct coupling state where the three rotary elements of the differential gear unit are rotated together and a non-direct coupling state where the three rotary elements of the differential gear unit are allowed to have differential rotation, and
the control device further switchably has
a fifth drive mode which is attained with the direct coupling mechanism being in the direct coupling state and in which the rotational speed of the input is transmitted as it is to the output and the torque of the second rotating electrical machine is transmitted to the output, and
a sixth drive mode which is attained with the direct coupling mechanism being in the direct coupling state and the decoupling mechanism being in the non-transmitting state and in which, with the second rotating electrical machine being decoupled from the output, the rotational speed of the input is transmitted as it is to the output.

4. The control device according to claim 3, wherein
in the vehicle drive device, a maximum converted rotational speed at a position of the output, which is determined in proportion to a maximum rotational speed that can be output from the second rotating electrical machine, is set to a value lower than an actual maximum rotational speed of the output, and
the second drive mode is attained when a vehicle travels at specific high vehicle speeds at which a rotational speed of the output is higher than the maximum converted rotational speed.

5. The control device according to claim 4, wherein
the vehicle drive device is connected to an electricity storage device that supplies electric power to at least one of the first rotating electrical machine and the second rotating electrical machine and that stores therein electric power generated by at least one of the first rotating electrical machine and the second rotating electrical machine, and when an amount of electricity stored in the electricity storage device decreases to a value equal to or lower than a reference charge value while the vehicle is traveling in the second drive mode, the control device switches the fixing mechanism to the non-fixing state to switch the drive mode to the third drive mode so as to cause the first rotating electrical machine to generate electricity.

6. The control device according to claim 5, wherein in the vehicle drive device, an order of rotational speeds of the three rotary elements of the differential gear unit are the first rotary element, the second rotary element, and the third rotary element.

7. The control device according to claim 1, wherein the vehicle drive device further includes a direct coupling mechanism that is configured to switch between a direct coupling state where the three rotary elements of the differential gear unit are rotated together and a non-direct coupling state where the three rotary elements of the differential gear unit are allowed to have differential rotation, and the control device further switchably has
   a fifth drive mode which is attained with the direct coupling mechanism being in the direct coupling state and in which the rotational speed of the input is transmitted as it is to the output and the torque of the second rotating electrical machine is transmitted to the output, and
   a sixth drive mode which is attained with the direct coupling mechanism being in the direct coupling state and the decoupling mechanism being in the non-transmitting state and in which, with the second rotating electrical machine being decoupled from the output, the rotational speed of the input is transmitted as it is to the output.

8. The control device according to claim 1, wherein in the vehicle drive device, a maximum converted rotational speed at a position of the output, which is determined in proportion to a maximum rotational speed that can be output from the second rotating electrical machine, is set to a value lower than an actual maximum rotational speed of the output, and the second drive mode is attained when a vehicle travels at specific high vehicle speeds at which a rotational speed of the output is higher than the maximum converted rotational speed.

9. The control device according to claim 1, wherein the vehicle drive device is connected to an electricity storage device that supplies electric power to at least one of the first rotating electrical machine and the second rotating electrical machine and that stores therein electric power generated by at least one of the first rotating electrical machine and the second rotating electrical machine, and when an amount of electricity stored in the electricity storage device decreases to a value equal to or lower than a reference charge value while the vehicle is traveling in the second drive mode, the control device switches the fixing mechanism to the non-fixing state to switch the drive mode to the third drive mode so as to cause the first rotating electrical machine to generate electricity.

10. The control device according to claim 1, wherein in the vehicle drive device, an order of rotational speeds of the three rotary elements of the differential gear unit are the first rotary element, the second rotary element, and the third rotary element.

11. A control device that controls a vehicle drive device, the vehicle drive device including
   an input that is drivingly coupled to an internal combustion engine,
   an output that is drivingly coupled to wheels,
   a first rotating electrical machine,
   a second rotating electrical machine that is drivingly coupled to the output,
   a differential gear unit having three rotary elements, which are a first rotary element that is drivingly coupled to the first rotating electrical machine, a second rotary element that is drivingly coupled to the input, and a third rotary element that is drivingly coupled to the output,
   a fixing mechanism that is configured to switch between a fixing state where the first rotary element is held stationary with respect to a non-rotary member and a non-fixing state where the first rotary element is allowed to rotate, and
   a decoupling mechanism that is configured to switch between a transmitting state where power is transmitted between the second rotating electrical machine and the output and a non-transmitting state where power is not transmitted between the second rotating electrical machine and the output, wherein the control device switchably has
   a first drive mode which is attained with the fixing mechanism being in the non-fixing state and in which a rotational speed of the input is steplessly shifted and transmitted to the output and torque of the second rotating electrical machine is transmitted to the output,
   a second drive mode which is attained with the fixing mechanism being in the fixing state and the decoupling mechanism being in the non-transmitting state and in which, with the second rotating electrical machine being decoupled from the output, the rotational speed of the input is shifted according to a gear ratio of the differential gear unit and transmitted to the output, and
   a fourth drive mode which is attained with the fixing mechanism being in the fixing state and in which the rotational speed of the input is shifted according to the gear ratio of the differential gear unit and transmitted to the output and the torque of the second rotating electrical machine is transmitted to the output.

12. The control device according to claim 11, wherein the vehicle drive device further includes a direct coupling mechanism that is configured to switch between a direct coupling state where the three rotary elements of the differential gear unit are rotated together and a non-direct coupling state where the three rotary elements of the differential gear unit are allowed to have differential rotation, and the control device further switchably has
   a fifth drive mode which is attained with the direct coupling mechanism being in the direct coupling state and in which the rotational speed of the input is transmitted as it is to the output and the torque of the second rotating electrical machine is transmitted to the output, and a sixth drive mode which is attained with the direct coupling mechanism being in the direct coupling state and the decoupling mechanism being in the non-transmitting state and in which, with the second rotating electrical machine being decoupled from the output, the rotational speed of the input is transmitted as it is to the output.

13. The control device according to claim 11, wherein
in the vehicle drive device, a maximum converted rotational speed at a position of the output, which is determined in proportion to a maximum rotational speed that can be output from the second rotating electrical machine, is set to a value lower than an actual maximum rotational speed of the output, and
the second drive mode is attained when a vehicle travels at specific high vehicle speeds at which a rotational speed of the output is higher than the maximum converted rotational speed.

14. The control device according to claim 11, wherein
the vehicle drive device is connected to an electricity storage device that supplies electric power to at least one of the first rotating electrical machine and the second rotating electrical machine and that stores therein electric power generated by at least one of the first rotating electrical machine and the second rotating electrical machine,
the control device further switchably has a third drive mode which is attained with the fixing mechanism being in the non-fixing state and the decoupling mechanism being in the non-transmitting state and in which, with the second rotating electrical machine being decoupled from the output, the rotational speed of the input is steples sly shifted and transmitted to the output, and
when an amount of electricity stored in the electricity storage device decreases to a value equal to or lower than a reference charge value while the vehicle is traveling in the second drive mode, the control device switches the fixing mechanism to the non-fixing state to switch the drive mode to the third drive mode so as to cause the first rotating electrical machine to generate electricity.

15. The control device according to claim 11, wherein
in the vehicle drive device, an order of rotational speeds of the three rotary elements of the differential gear unit are the first rotary element, the second rotary element, and the third rotary element.

16. A control device that controls a vehicle drive device, the vehicle drive device including
an input that is drivingly coupled to an internal combustion engine,
an output that is drivingly coupled to wheels,
a first rotating electrical machine,
a second rotating electrical machine that is drivingly coupled to the output,
a differential gear unit having three rotary elements, which are a first rotary element that is drivingly coupled to the first rotating electrical machine, a second rotary element that is drivingly coupled to the input, and a third rotary element that is drivingly coupled to the output,
a fixing mechanism that is configured to switch between a fixing state where the first rotary element is held stationary with respect to a non-rotary member and a non-fixing state where the first rotary element is allowed to rotate, and
a decoupling mechanism that is configured to switch between a transmitting state where power is transmitted between the second rotating electrical machine and the output and a non-transmitting state where power is not transmitted between the second rotating electrical machine and the output,
wherein the control device switchably has
a first drive mode which is attained with the fixing mechanism being in the non-fixing state and in which a rotational speed of the input is steplessly shifted and transmitted to the output and torque of the second rotating electrical machine is transmitted to the output, and
a second drive mode which is attained with the fixing mechanism being in the fixing state and the decoupling mechanism being in the non-transmitting state and in which, with the second rotating electrical machine being decoupled from the output, the rotational speed of the input is shifted according to a gear ratio of the differential gear unit and transmitted to the output,
the vehicle drive device further includes a direct coupling mechanism that is configured to switch between a direct coupling state where the three rotary elements of the differential gear unit are rotated together and a non-direct coupling state where the three rotary elements of the differential gear unit are allowed to have differential rotation, and
the control device further switchably has
a fifth drive mode which is attained with the direct coupling mechanism being in the direct coupling state and in which the rotational speed of the input is transmitted as it is to the output and the torque of the second rotating electrical machine is transmitted to the output, and
a sixth drive mode which is attained with the direct coupling mechanism being in the direct coupling state and the decoupling mechanism being in the non-transmitting state and in which, with the second rotating electrical machine being decoupled from the output, the rotational speed of the input is transmitted as it is to the output.

17. The control device according to claim 16, wherein
in the vehicle drive device, a maximum converted rotational speed at a position of the output, which is determined in proportion to a maximum rotational speed that can be output from the second rotating electrical machine, is set to a value lower than an actual maximum rotational speed of the output, and
the second drive mode is attained when a vehicle travels at specific high vehicle speeds at which a rotational speed of the output is higher than the maximum converted rotational speed.

18. The control device according to claim 16, wherein
the vehicle drive device is connected to an electricity storage device that supplies electric power to at least one of the first rotating electrical machine and the second rotating electrical machine and that stores therein electric power generated by at least one of the first rotating electrical machine and the second rotating electrical machine,
the control device further switchably has a third drive mode which is attained with the fixing mechanism being in the non-fixing state and the decoupling mechanism being in the non-transmitting state and in which, with the second rotating electrical machine being decoupled from the output, the rotational speed of the input is steples sly shifted and transmitted to the output, and when an amount of electricity stored in the electricity storage device decreases to a value equal to or lower than a reference charge value while the vehicle is traveling in the second drive mode, the control device switches the fixing mechanism to the non-fixing state to switch the drive mode to the third drive mode so as to cause the first rotating electrical machine to generate electricity.

19. The control device according to claim 16, wherein
in the vehicle drive device, an order of rotational speeds of the three rotary elements of the differential gear unit are the first rotary element, the second rotary element, and the third rotary element.

\* \* \* \* \*